United States Patent
Okimura et al.

(10) Patent No.: US 11,850,982 B2
(45) Date of Patent: Dec. 26, 2023

(54) SEAT WITH BLOWER

(71) Applicant: TS TECH CO., LTD., Asaka (JP)

(72) Inventors: Atsushi Okimura, Tochigi (JP);
Tatsumi Konno, Tochigi (JP); Wataru Nishii, Tochigi (JP); Yuji Nakano, Tochigi (JP); Hiroshi Izawa, Tochigi (JP); Hiromi Taniguchi, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/464,147

(22) Filed: Sep. 1, 2021

(65) Prior Publication Data

US 2022/0055507 A1 Feb. 24, 2022

Related U.S. Application Data

(63) Continuation of application No. 16/338,249, filed as application No. PCT/JP2017/031393 on Aug. 31, 2017, now Pat. No. 11,135,949.

(30) Foreign Application Priority Data

Sep. 30, 2016 (JP) ................................. 2016-193299
Sep. 30, 2016 (JP) ................................. 2016-193304

(51) Int. Cl.
*B60N 2/56* (2006.01)

(52) U.S. Cl.
CPC ................................. *B60N 2/5657* (2013.01)

(58) Field of Classification Search
CPC ............................ B60N 2/5657; B60N 2/5642
See application file for complete search history.

(56) References Cited

U.S. PATENT DOCUMENTS 6,478,369 B1 11/2002 Aoki et al.
7,287,812 B2 10/2007 Ishima et al.
(Continued)

FOREIGN PATENT DOCUMENTS

CN 105491915 4/2016
JP 359182257 12/1984
(Continued)

OTHER PUBLICATIONS

International Search Report issued for International Patent Application No. PCT/JP2017/031393, dated Nov. 7, 2017, 5 pages including English translation.
(Continued)

*Primary Examiner* — David R Dunn
*Assistant Examiner* — Tania Abraham
(74) *Attorney, Agent, or Firm* — Hamre, Schumann, Mueller & Larson, P.C.

(57) ABSTRACT

A seat comprises a seat cushion pad (20) including an air flow passage (21), and a blower connected to the air flow passage (21). The seat cushion pad (20) comprises a pad body (100), and a cover member (200) disposed on an upper surface of the pad body (100) to form the air flow passage (21) between the pad body (100) and the cover member (200). The cover member (200) comprises a first cover member (210) disposed on the upper surface of the pad body (100), and a second cover member (220) disposed on an upper surface of the first cover member (210). The first cover member (210) is fixed to the pad body (100), and the second cover member (220) is fixed to the first cover member (210) and to the pad body (100).

9 Claims, 16 Drawing Sheets

(56) References Cited

U.S. PATENT DOCUMENTS

| | | | |
|---|---|---|---|
| 7,857,395 | B2 | 12/2010 | Kikuchi et al. |
| 7,931,330 | B2 | 4/2011 | Itou et al. |
| 8,757,726 | B2 | 6/2014 | Oota |
| 9,707,875 | B2 | 7/2017 | Abe et al. |
| 10,124,705 | B2 | 11/2018 | Abe et al. |
| 10,399,470 | B2 | 9/2019 | Kobayashi et al. |
| 10,752,140 | B2 | 8/2020 | Abe et al. |
| 11,001,176 | B2 | 5/2021 | Kobayashi et al. |
| 2002/0096915 | A1 | 7/2002 | Haupt et al. |
| 2005/0280294 | A1 | 12/2005 | Ishima et al. |
| 2007/0176471 | A1* | 8/2007 | Knoll ............... B60N 2/5657 297/180.14 |
| 2009/0079236 | A1 | 3/2009 | Itou et al. |
| 2016/0207431 | A1 | 7/2016 | Abe et al. |
| 2017/0036575 | A1 | 2/2017 | Kobayashi et al. |
| 2017/0274804 | A1 | 9/2017 | Abe et al. |
| 2019/0031059 | A1 | 1/2019 | Abe et al. |
| 2019/0375317 | A1 | 12/2019 | Kobayashi et al. |
| 2020/0376991 | A1 | 12/2020 | Abe et al. |
| 2021/0229581 | A1 | 7/2021 | Kobayashi et al. |

FOREIGN PATENT DOCUMENTS

| | | |
|---|---|---|
| JP | H01123517 | 8/1989 |
| JP | 2001047848 | 2/2001 |
| JP | 2005095342 | 4/2005 |
| JP | 2005152158 | 6/2005 |
| JP | 2005287532 | 10/2005 |
| JP | 2007285278 | 11/2007 |
| JP | 2009077760 | 4/2009 |
| JP | 2012085724 | 5/2012 |
| JP | 2013177027 | 9/2013 |
| JP | 2013255829 | 12/2013 |
| JP | 2015047217 | 3/2015 |
| KR | 100902134 | 6/2009 |
| KR | 20130057037 | 5/2013 |
| WO | 2015030195 | 3/2015 |
| WO | 2015156218 A1 | 10/2015 |

OTHER PUBLICATIONS

Office Action issued for Japanese Patent Application No. 2016-193299, Dispatch Date: May 14, 2019, 6 pages Including English translation.

Extended European Search Report issued for European Patent Application No. 17855560.3, dated Aug. 2, 2019, 7 pages.

Office Action issued for Japanese Patent Application No. 2016-193299, Dispatch Date: Dec. 10, 2019, 6 pages Including English translation.

Office Action issued for Japanese Patent Application No. 2019-110166, Dispatch Date: Jun. 9, 2020, 7 pages Including English translation.

Office Action issued for Chinese Patent Application No. 201780060857.4, dated Mar. 1, 2021, 15 pages including English translation.

Notification of Reason(s) for Refusal issued for Japanese Patent Application No. 2021-065707, Dispatch Date: Nov. 8, 2022, 6 pages including English translation.

Notice of Reasons for Refusal issued for Japanese Patent Application No. 2022-022570, Dispatch date: Oct. 17, 2023, 12 pages including English machine translation.

* cited by examiner

FIG.4
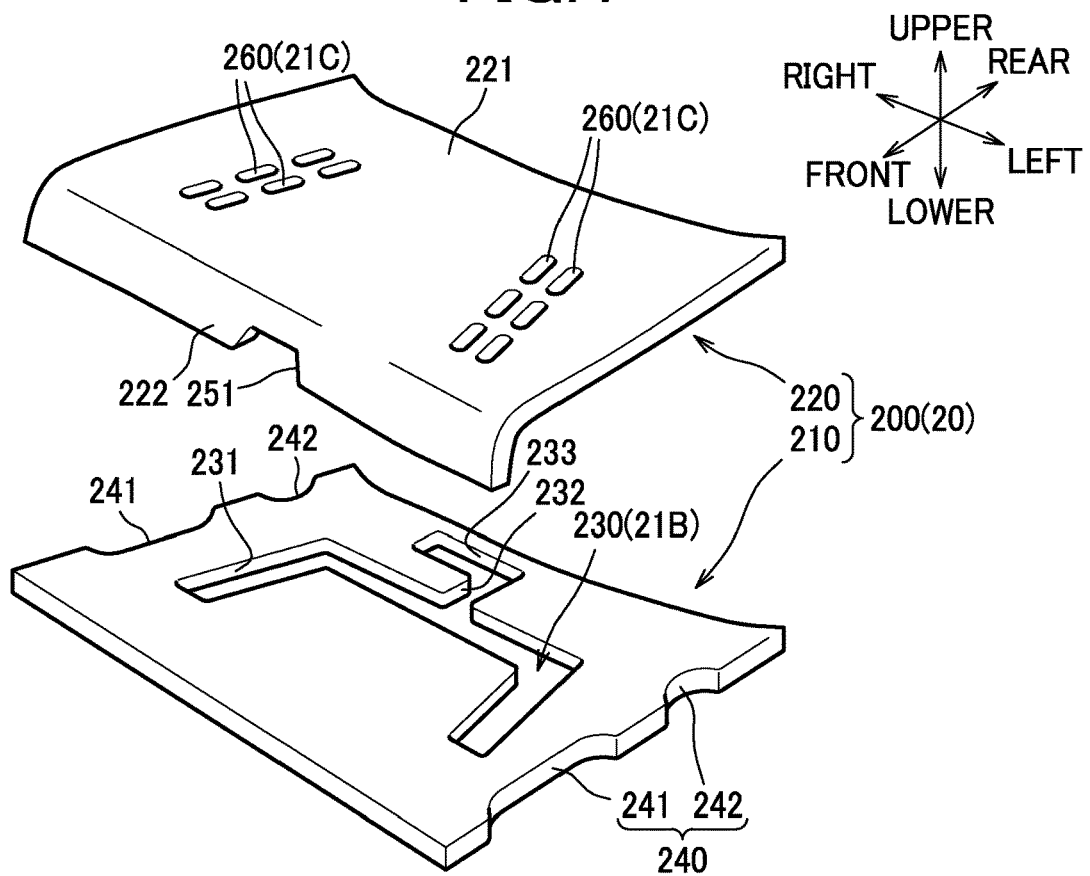
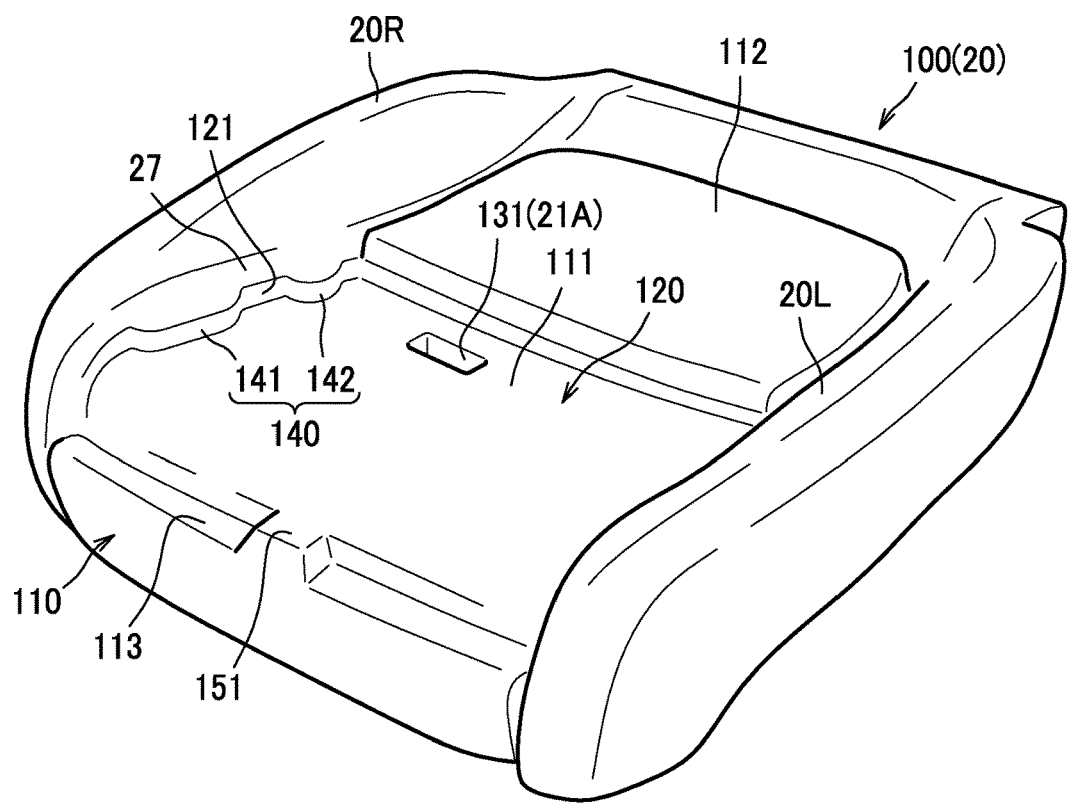

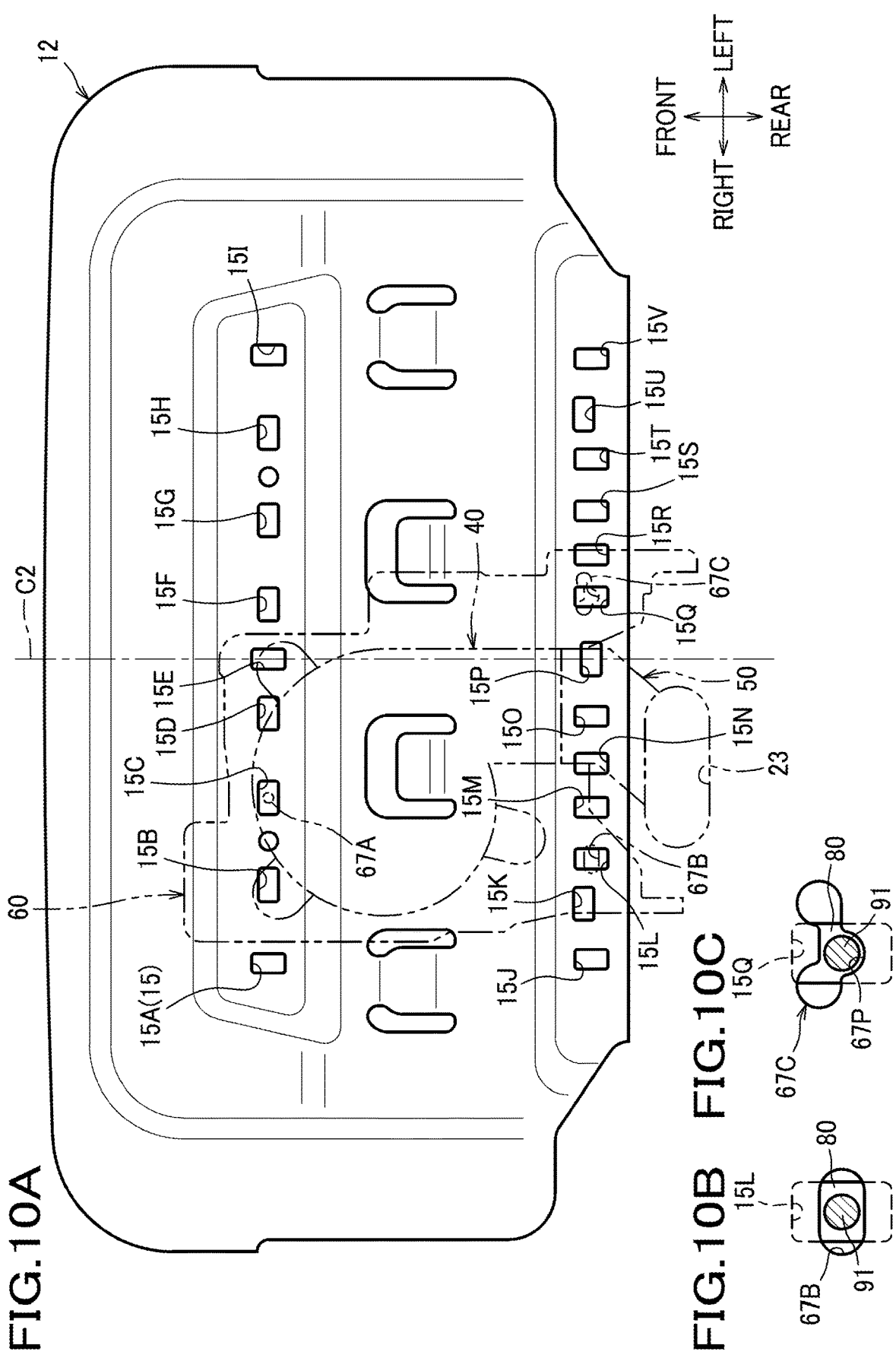

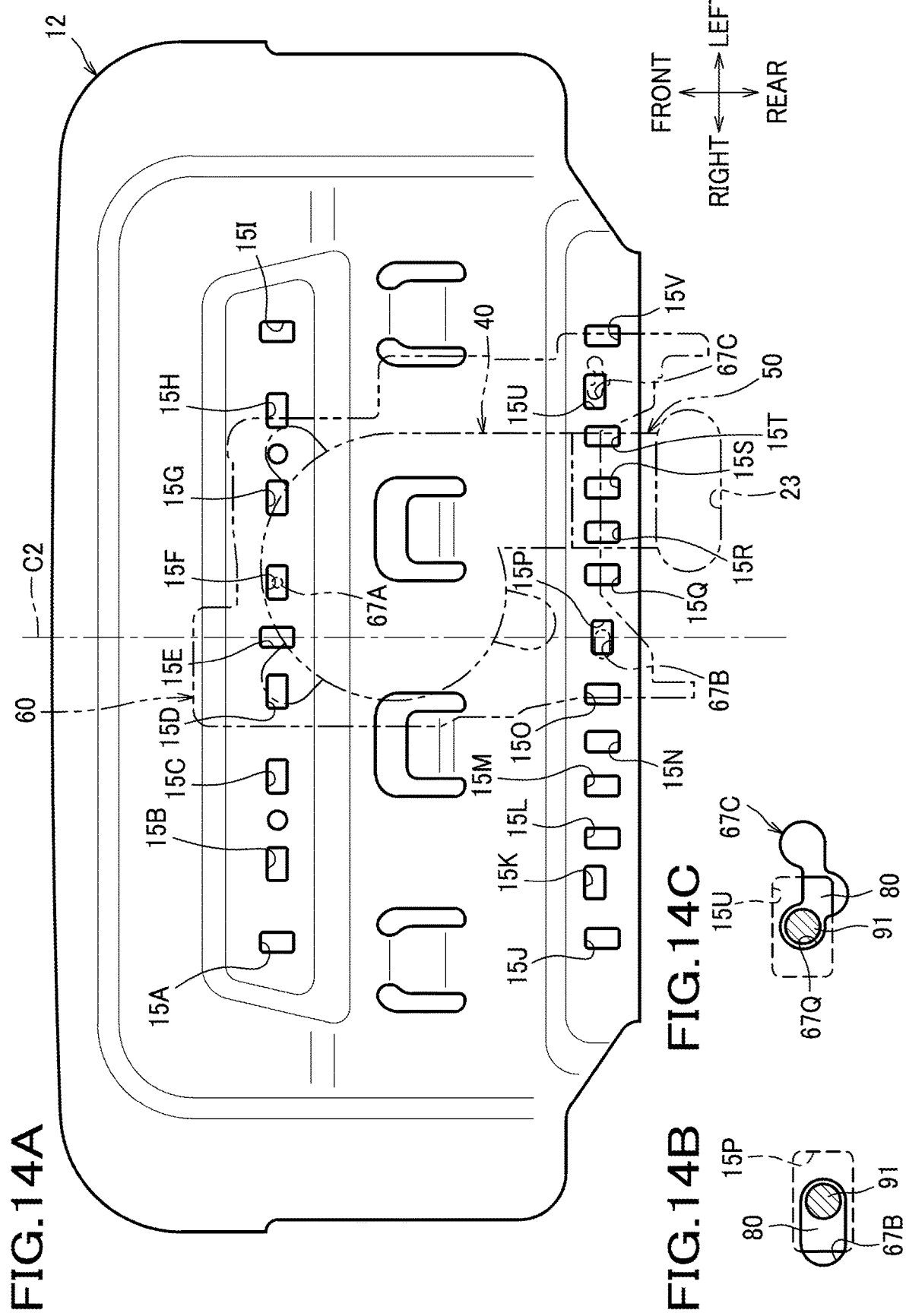

SEAT WITH BLOWER

TECHNICAL FIELD

The present invention relates to a seat comprising a seat pad including an air flow passage, and a blower connected to the air flow passage.

BACKGROUND ART

As a seat pad including an air flow passage, for example, JP 2005-095342 A discloses a cushion pad consisting of a cushion pad body, and a slab bonded to a seat surface side of the cushion pad body. In this technique, the slab is of a two-layered structure consisting of a plate-shaped front slab layer and a plate-shaped back slab layer, and the air flow passage consists of an air inlet opening formed in the cushion pad body, an air distribution passage formed in the back slab layer and having a groove shape, and a plurality of ventilation passages formed in the front slab layer and each formed as a through-hole. The back slab layer and the front slab layer are bonded together to form a two-layered slab, followed by bonding and integrating the two-layered slab to the seat surface side of the cushion pad body, to thereby obtaining the cushion pad.

In a seat pad consisting of a plurality of parts, if an occupant sits on the seat pad and the slab layer deforms to be recessed at and around a central portion thereof, an end portion of the slab layer is prone to separate from the cushion pad body. At this time, according to the conventional art, the end portion of the slab layer may disadvantageously be peeled off from the cushion pad body. The same can be said between the front slab layer and the back slab layer.

Accordingly, a first object of the present invention is to provide a seat in which a seat pad comprising a plurality of parts can be firmly combined together.

A vehicle seat comprising a seat pad including an air flow passage, a blower, and a duct through which the blower and the air flow passage communicate with each other so that air from the blower is ejected from the surface of the seat cushion or the surface of the seat back through the duct and the air flow passage is conventionally known (JP 2005-287532 A). In this technique, the duct is connected to the seat pad by inserting an end portion of the duct into a tubular-shaped insert member embedded in the seat pad.

According to the structure disclosed in JP 2005-287532 A, the duct may disadvantageously come off a connecting member, such as the insert member, through which the duct and the seat pad are connected.

Accordingly, a second object of the present invention is to provide a seat which can prevent the duct from coming off the connecting member.

SUMMARY OF THE INVENTION

To attain the first object, a seat according to the present invention comprises: a seat pad and a blower, the seat pad including an air flow passage, and the blower being connected to the air flow passage, wherein the seat pad comprises a pad body and a cover member, the pad body having an occupant-side surface, and the cover member being disposed on the occupant-side surface of the pad body to form the air flow passage between the pad body and the cover member, wherein the cover member comprises a first cover member disposed on the occupant-side surface of the pad body, and a second cover member disposed on an occupant-side surface of the first cover member, wherein the first cover member is fixed to the pad body, and wherein the second cover member is fixed to the first cover member and to the pad body.

With this configuration, the pad body, the first cover member, and the second cover member are fixed to each other, so that the seat pad comprising a plurality of parts can be firmly combined together.

In the above-described seat, the first cover member may have an opposite surface that is opposite to the occupant-side surface of the first cover member, and the opposite surface of the first cover member may be fixed to the occupant-side surface of the pad body, and the second cover member may have an opposite surface that is opposite to an occupant-side surface of the second cover member, and the opposite surface of the second cover member may be fixed to the occupant-side surface of the first cover member and to the occupant-side surface of the pad body.

With this configuration, the surfaces, to which a force is applied when an occupant sits on the seat, are fixed to each other, so that the seat pad comprising the plurality of parts can be more firmly combined together.

In the above-described seat, a first engageable protruding portion shaped to protrude as viewed from an occupant seated on the seat may be provided on one of the pad body and the first cover member, and a first engageable recess portion shaped to be recessed as viewed from the occupant seated on the seat may be provided on the other one of the pad body and the first cover member, the first engageable recess portion being fitted in the first engageable recess portion.

With this configuration, the pad body and the cover member can be positioned with ease by engaging the first engageable protruding portion and the first engageable recess portion when the cover member is disposed on the pad body.

In the above-described seat, the first engageable protruding portion may be provided on the pad body, and the second cover member may have an opposite surface that is opposite to an occupant-side surface of the second cover member, and the opposite surface of the second cover member may be fixed to an occupant-side surface of the first engageable protruding portion.

With this configuration, a boundary between the first engageable protruding portion and the first engageable recess portion that may form a gap of the seat pad comprising the plurality of parts can be covered with the second cover member, so that the feel of seating for the occupant can be improved.

In the above-described seat, the first engageable protruding portion may comprise a first protruding portion and a second protruding portion that are arranged spaced apart in a predetermined direction, and the first engageable recess portion may comprise a first recess portion in which the first protruding portion is fitted, and a second recess portion in which the second protruding portion is fitted.

With this configuration, the pad body and the cover member can be positioned accurately.

In the above-described seat, the first recess portion and the second recess portion may be different in shape.

With this configuration, wrong assembly of the pad body and the cover member can be avoided; the first engageable protruding portion and the first engageable recess portion do not engage properly, for example, if the first cover member is disposed on the pad body in a wrong orientation, front side back or inside out.

In the above-described seat, the seat pad may have a central portion, and right and left side portions disposed on a right side and a left side of the central portion, the right and left side portions protruding toward an occupant seated on the seat beyond the central portion, and the first engageable protruding portion and the first engageable recess portion may be disposed laterally inward of the side portions.

With this configuration, the first engageable protruding portion and the first engageable recess portion are arranged on the central portion that is flatter than the side portions; therefore, as compared with an alternative configuration in which the first engageable protruding portion and the first engageable recess portion are arranged, for example, on a slanted surface of the side portion, the seat pad can be designed in a simple structure.

In the above-described seat, the seat pad may include right and left tuck-in grooves configured to allow an outer skin material to be tucked therein, and the first engageable protruding portion and the first engageable recess portion may be disposed laterally inward of the tuck-in grooves.

In the above-described seat, the seat pad may be a pad material for a seat cushion, one of the pad body and the second cover member may have a second engageable protruding portion at a front end portion thereof, and the other one of the pad body and the second cover member may have a second engageable recess portion in which the second engageable recess portion is fitted.

With this configuration, the pad body and the cover member can be positioned with ease by engaging the second engageable protruding portion with the second engageable recess portion when the cover member is disposed on the pad body. Further, if the first engageable protruding portion and the first engageable recess portion are provided, the pad body and the cover member can be positioned accurately by providing the second engageable protruding portion and the second engageable recess portion.

In the above-described seat, the second engageable protruding portion and the second engageable recess portion may be different in at least one of shape, size, arrangement position, and the number thereof according to specifications of the seat.

With this configuration, for example, if the second cover member of the seat with a different specifications is placed on the pad body, the second engageable protruding portion and the second engageable recess portion do not engage properly; therefore, wrong assembly of the pad body and the cover member having different specifications can be avoided.

Further, to attain the second object, a seat according to the present invention comprises: a seat pad including an air flow passage, a blower, and a duct through which the blower and the air flow passage communicate with each other, wherein the seat further comprises a tubular connecting member having one end portion and another end portion, at least the one end portion being disposed within the air flow passage and the another end portion being connected to the duct, and wherein the connecting member comprises at the one end portion thereof a first stopper portion configured to be caught on an inner surface of the air flow passage, and at the another end portion thereof a second stopper portion configured to be caught on the duct.

With this configuration, the engagement between the connecting member and the duct can prevent the duct from coming off the connecting member because the connecting member has the second stopper portion which can be caught on the duct.

In the above-described seat, the another end portion of the connecting member may be inserted in the duct, and the second stopper portion may be caught on an inner surface of the duct.

With this configuration, as compared with an alternative configuration in which the duct is inserted in the tubular connecting member, the connecting member can be reduced in size.

In the above-described seat, the inner surface of the duct may have a recess portion on which the second stopper portion is caught.

With this configuration, the duct from coming off the connecting member can be prevented with a simple configuration.

In the above-described seat, the duct may have an extendable and contractible bellows portion, and the recess portion may be formed on the bellows portion.

This configuration makes it possible to absorb shaking, vibration and the like using the extendable and contractible bellows portion, thereby further preventing the duct from coming off the connecting member.

In the above-described seat, the recess portion may be a root portion of the bellows portion at the inner surface of the duct.

With this configuration, as compared with an alternative configuration in which the inner peripheral surface of the bellows portion is provided with a recess portion, on which the second stopper portion is caught, in addition to the root portion, the duct can be designed in a simple structure.

In the above-described seat, the second stopper portion may comprise a first flange configured to protrude out from an outer peripheral surface of the connecting member and to extend along a wall that forms the root portion.

This configuration makes the edge of the first flange less likely to scratch the wall forming the root portion, thereby suppressing the damage on the duct. Further, the first flange can be made to contact the inner surface of the duct along the entire perimeter of the first flange, so that the close contactability between the connecting member and the duct can be increased and the leakage of air can be suppressed.

In the above-described seat, the duct may have a crest portion of the bellows portion that is formed on a reverse side of the root portion and disposed within the air flow passage, the crest portion being in contact with the inner surface of the air flow passage.

With this configuration, motion of the duct can be restricted by the seat pad, so that the duct from coming off the connecting member can further be prevented.

In the above-described seat, the connecting member may have a reinforcement portion configured to bridge between and connect a plurality of portions on the inner surface.

With this configuration, collapsing deformation of the tubular connecting member can be suppressed. Further, since the deformation of the connecting member can be suppressed, the duct from coming off the connecting member can further be prevented and sufficient path of air can be ensured.

In the above-described seat, a cross-sectional shape of the connecting member as taken along a plane perpendicular to an axial direction of the tubular connecting member may have an elongate shape, and the reinforcement portion may be provided at a center in a longitudinal direction of the cross-sectional shape.

This configuration makes it possible to further suppress collapsing deformation of the tubular connecting member, to further prevent the duct from coming off the connecting member, and to ensure more sufficient path of air.

In the above-described seat, the first stopper portion may comprise a second flange configured to protrude out from an outer peripheral surface of the connecting member, and a stepped portion, on which the second flange is caught, may be formed on the inner surface of the air flow passage.

With this configuration, the connecting member can be attached to the seat pad with ease only by inserting the connecting member in the air flow passage and thereafter engaging the second flange with the stepped portion. Further, the second flange can be made to contact the inner surface of the air flow passage along the entire perimeter of the second flange, so that the close contactability between the connecting member and the seat pad can be increased and the leakage of air can be suppressed.

BRIEF DESCRIPTION OF DRAWINGS

FIG. 4 is a perspective view of a pad body, a first cover member, and a second cover member used for a driver's seat.

FIG. 10A is a view showing the position at which the bracket is attached to the pan frame of the car seat used for the driver's seat.

FIG. 10B is a view showing the position of a shank of a tapping screw in a second attachment hole.

FIG. 10C is a view showing the position of the shank of the tapping screw in a third attachment hole.

FIG. 14A is a view showing the position at which the bracket is attached to the pan frame of the car seat used for the passenger's seat.

FIG. 14B is a view showing the position of the shank of the tapping screw in a second attachment hole.

FIG. 14C is a view showing the position of the shank of the tapping screw in a third attachment hole.

DESCRIPTION OF EMBODIMENTS

One embodiment of the present invention will be described below with reference made to the accompanying drawings. Hereinafter, front/rear (frontward/rearward), right/left (lateral), and upper/lower (upward/downward or vertical) directions are designated as from the view point of an occupant seated on a seat (i.e., seated person).

<Overall Configuration of Seat>

Figure 1:
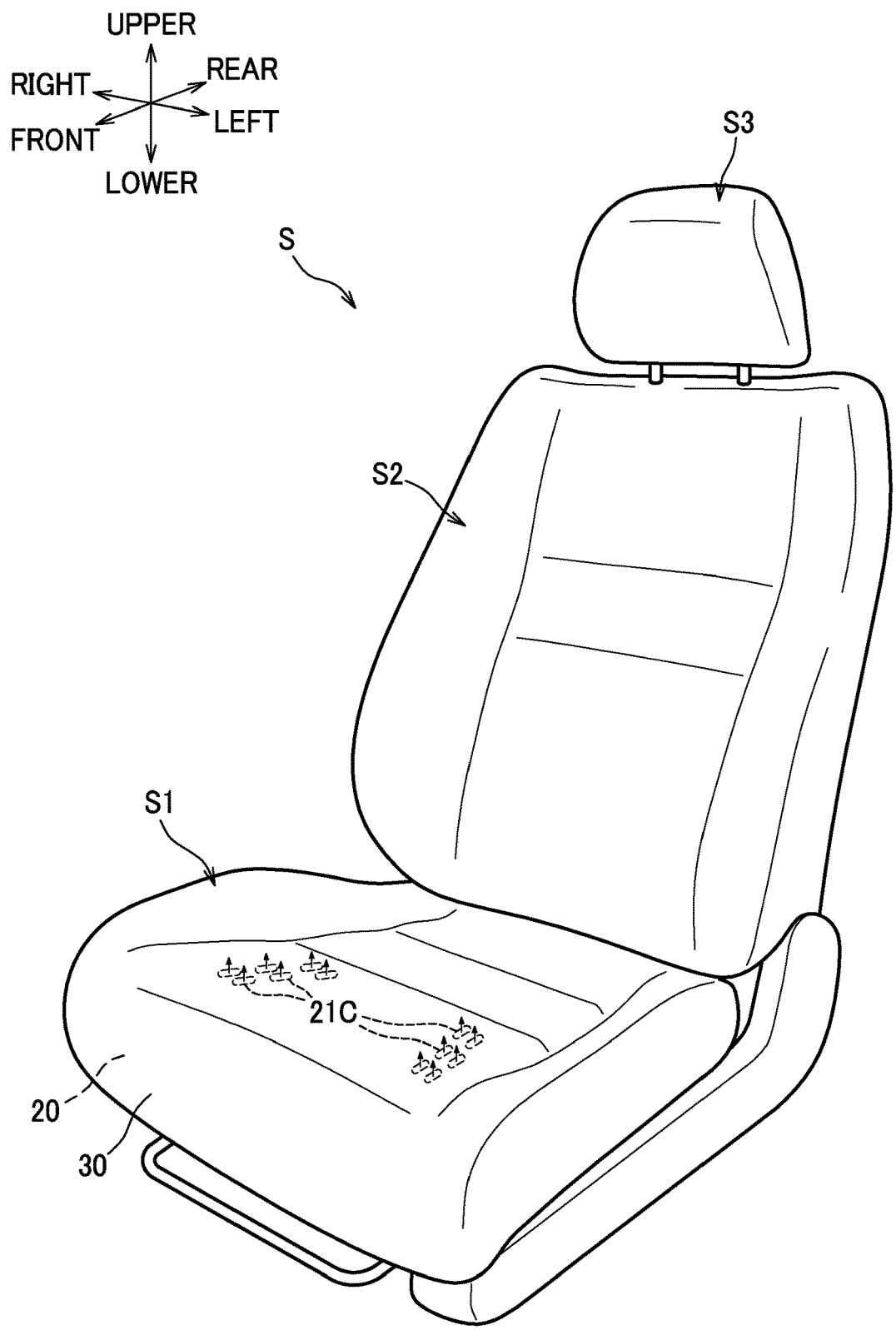
FIG. 1 is a perspective view of a car seat as a seat according to one exemplary embodiment.

As seen in FIG. 1, a seat according to this embodiment is configured as a car seat S to be installed in an automobile, and includes a seat cushion S1, a seat back S2, and a headrest S3.

Figure 2:
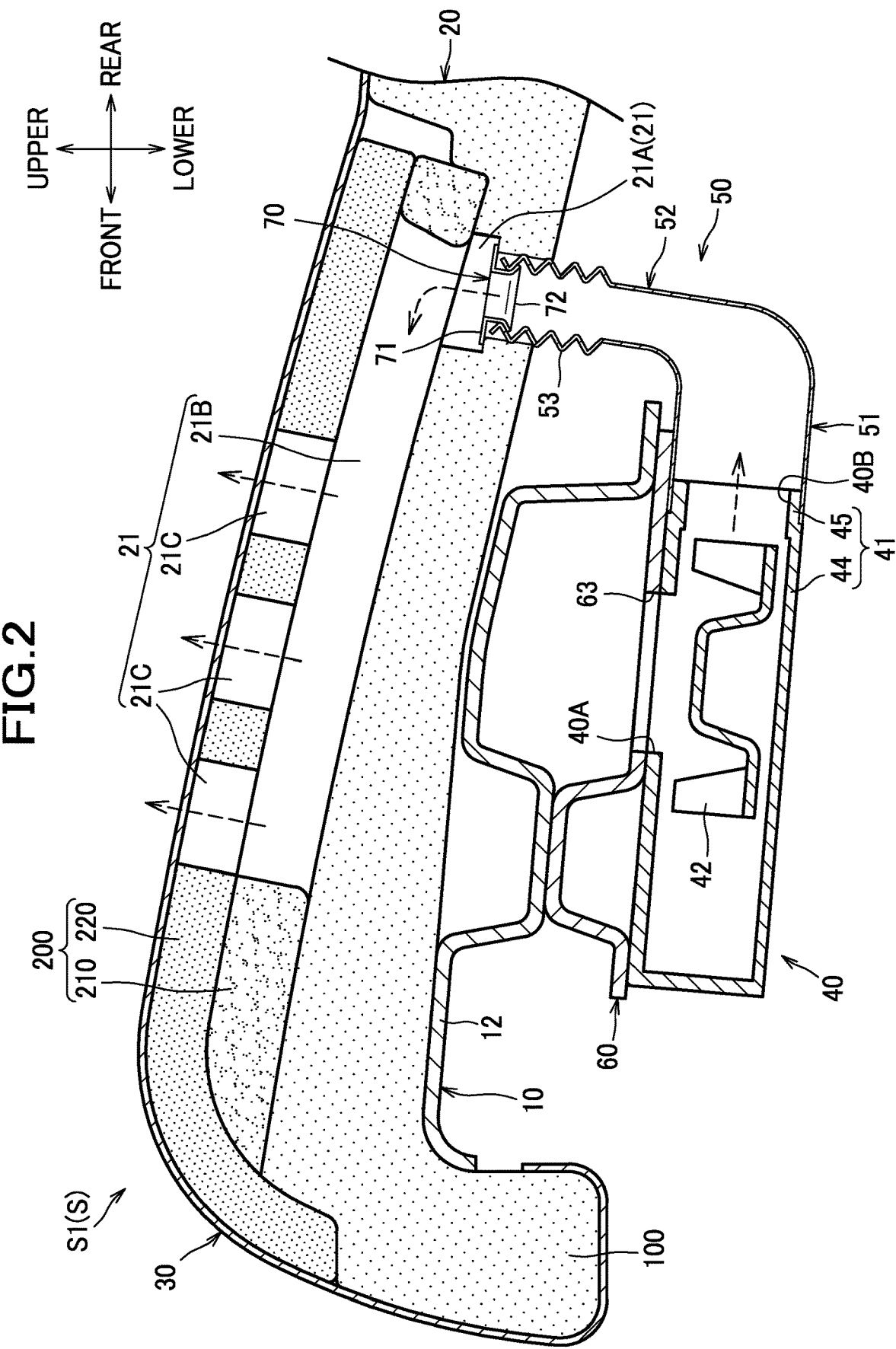
FIG. 2 is a sectional view of a seat cushion as viewed from the left side.

As seen in FIG. 2, the seat cushion S1 includes a seat cushion frame 10 constituting a framework of the seat cushion S1, a seat cushion pad 20 as a seat pad, and an outer skin material 30. The seat cushion S1 is configured to have the seat cushion frame 10 upholstered with the seat cushion pad 20 and the outer skin material 30.

The seat cushion pad 20 includes an air flow passage 21. The air flow passage 21 includes a first air flow passage 21A, a second air flow passage 21B, and a plurality of third air flow passages 21C. The first air flow passage 21A extends downward (i.e., in a direction away from the seated person) from the second air flow passage 21B; the first air flow passage 21A is provided to allow the second air flow passage 21B and a space under the seat cushion pad 20 to be in communication with each other. The third air flow passages 21C extend upward (i.e., toward the seated person) from the second air flow passage 21B; each third air flow passage 21C is provided to allow the second air flow passage 21B and a space over the seat cushion pad 20 to be in communication with each other.

The car seat S further includes a blower 40 and a duct 50. As indicated by the arrows in FIG. 2, the car seat S is configured to allow air blown from the blower 40 to pass through the duct 50 and the air flow passage 21 and blow out from the upper surface of the seat cushion pad 20 toward the seated person. The outer skin material 30 may be made of a material having air permeability. As an alternative, the outer skin material 30 may have ventilation holes for allowing air to path therethrough at positions corresponding to the third air flow passages 21C.

The seat cushion frame 10 includes right and left side frames (not shown) laterally spaced apart from each other, and a pan frame 12 configured to connect the right side frame and the left side frame. The pan frame 12 is a plate-like frame made by press working sheet metal. The pan frame 12 is disposed at a front portion of the seat cushion S1.

The blower 40 is a sirocco fan by way of example. The blower 40 includes a casing 41, an impeller 42, and a motor (not shown) for rotating the impeller 42. The casing 41 includes a casing body 44 for accommodating the impeller 42 and the motor, and a tubular outlet portion 45 extending rearward from a left end portion of the casing body 44. The casing body 44 has an upper surface in which an inlet opening 40A for aspiration of air is formed. An outlet opening 40B for blowing out air is formed at a rear end of the outlet portion 45. The blower 40 is attached to the pan frame 12 through a bracket 60. Further, the blower 40 is connected to the air flow passage 21 formed in the seat cushion pad 20 through a duct 50 or the like.

The duct 50 is a pipe member, and includes a first pipe portion 51 extending in the front-rear direction, and a second pipe portion 52 bent and extending upward from a rear end of the first pipe portion 51. The second pipe portion 52 includes a flexible bellows portion 53 capable of being extended and contracted. The duct 50 is connected to the blower 40 and the seat cushion pad 20; a front end portion of the first pipe portion 51 is connected to the outlet portion 45 of the blower 40, and an upper end portion of the second pipe portion 52 is connected to the seat cushion pad 20 through a tubular connecting member 70.

<Detailed Configuration of Seat>

Figure 3:
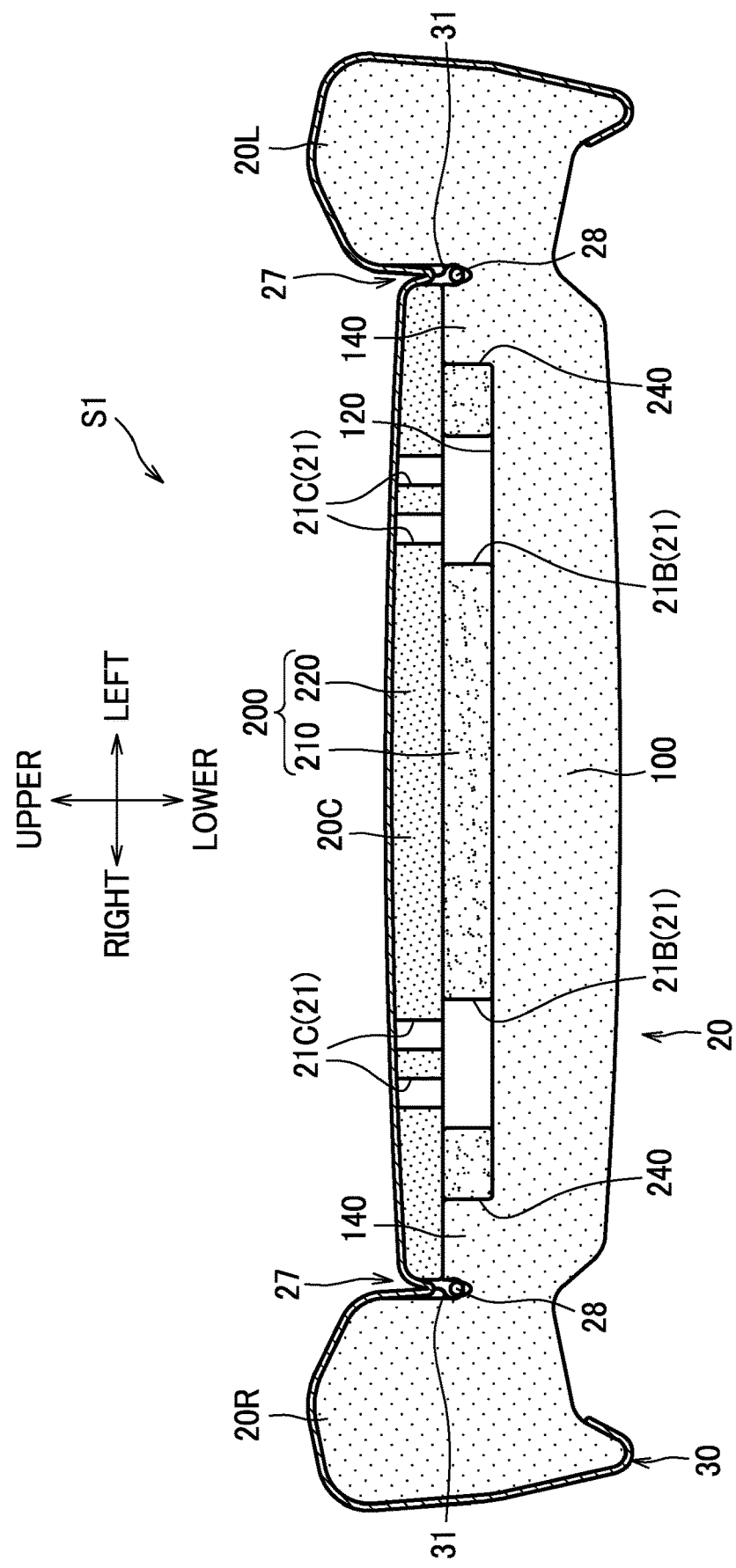
FIG. 3 is a sectional view of the seat cushion as viewed from the front.

As seen in FIG. 3, the seat cushion pad 20 includes a central portion 20C, and left and right side portions 20L, 20R disposed on the left side and the right side of the central portion 20C and protruding upward beyond the central portion 20C. Further, the seat cushion pad 20 includes a pair of left and right tuck-in grooves 27 at boundaries between the central portion 20C and the left and right side portions 20L, 20R; the tuck-in grooves 27 extend in the front-rear direction and allow the outer skin material to be tucked therein. As an example, a tucking wire 28 for tucking the outer skin material 30 in the tuck-in groove 27 is embedded in the seat cushion pad 20 by insert molding. The tucking wire 28 is partly exposed from a plurality of holes formed in the bottom portion of the tuck-in groove 27. The outer skin material 30 is fastened to the seat cushion pad 20 by engaging hook members 31 with the exposed portions of the tucking wire 28.

As seen in FIG. 4, the seat cushion pad 20 includes a pad body 100, and a cover member 200 disposed on an upper surface (i.e., occupant-side surface) of the pad body 100. The pad body 100 and the cover member 200 can be made of a material such as urethane foam. The pad body 100 and the cover member 200 may be made of the same material or different materials.

The pad body 100 includes a central body portion 110 that constitutes a central portion 20C (see FIG. 3) together with the cover member 200, and side portions 20L, 20R disposed on the left side and the right side of the central body portion 110 and integral with the central body portion 110. The central body portion 110 includes a first body portion 111, a second body portion 112 at the rear of the first body portion 111, and a third body portion 113 at the front of the first body portion 111.

Figure 5:
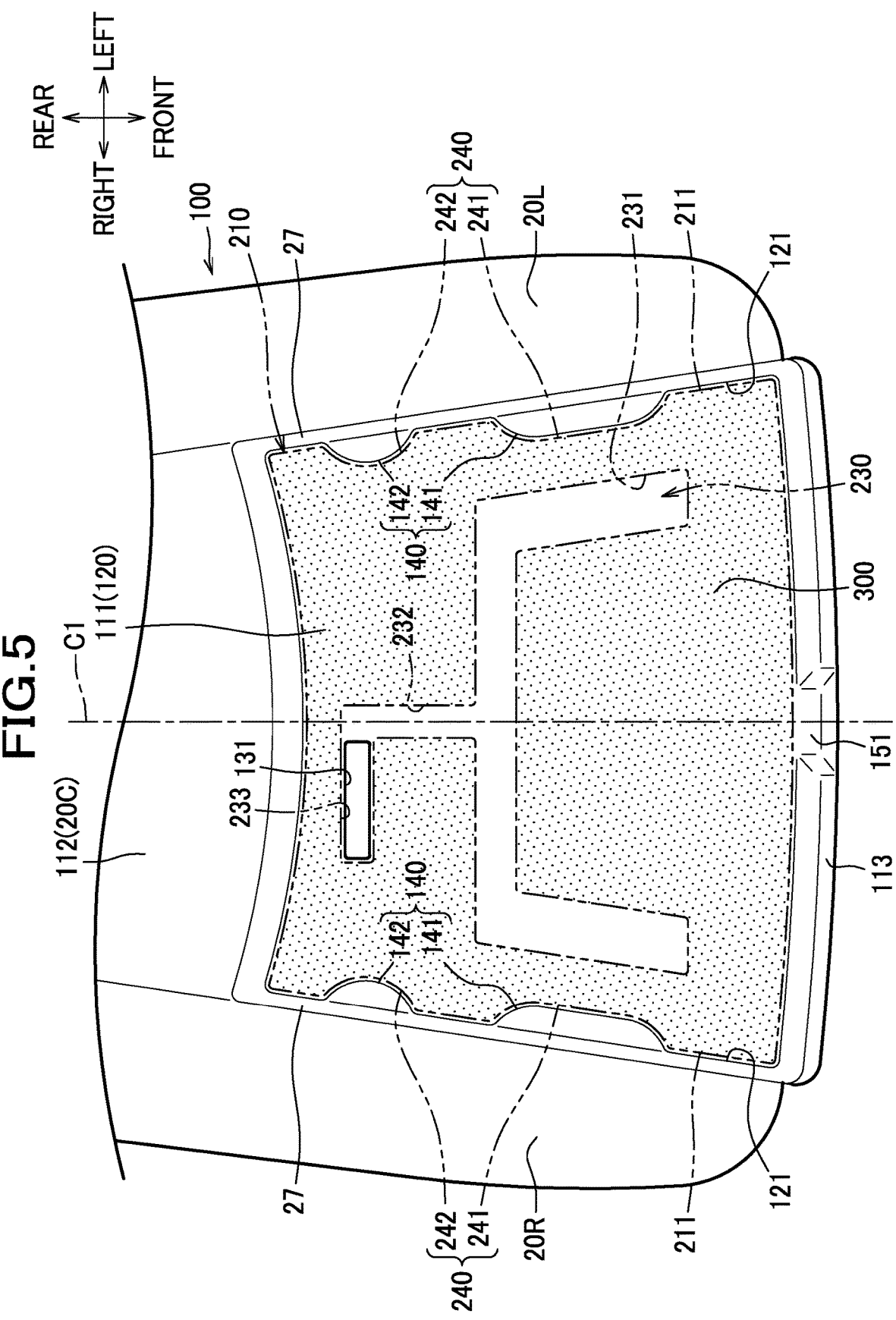
FIG. 5 is a top view of a front-side portion of the pad body and the first cover member.

The upper surface of the first body portion 111 is lower than the second body portion 112 and a bottom portion of a tuck-in groove 27. Accordingly, a laterally central portion of the upper surface of the pad body 100 is shaped to be recessed at a front portion thereof relative to the side portions 20L, 20R and the second body portion 112, and the front side thereof opens to form a cover attachment recess portion 120. The cover member 200 is disposed in the cover attachment recess portion 120. The first body portion 111 has a first ventilation hole 131 extending through the first body portion 111 in the upper-lower direction. The first ventilation hole 131 is an opening for forming a first air flow passage 21A; the first ventilation hole 131 is formed in a rear portion of the first body portion 111. To be more specific, as seen in FIG. 5, the first ventilation hole 131 is located in a position shifted rightward from the lateral center C1 of the seat cushion pad 20.

First engageable protruding portions 140 are provided substantially symmetrically in the lateral direction on the right and left inner side surfaces 121, 121 of the cover attachment recess portion 120 formed on the pad body 100. The first engageable protruding portion 140 is a protruding portion shaped to protrude laterally inward as viewed from above; the first engageable protruding portion 140 includes a first protruding portion 141 and a second protruding portion 142. The first protruding portion 141 and the second protruding portion 142 are spaced apart in a predetermined direction, more specifically, in the front-rear direction. To be more specific, the first protruding portion 141 is provided on the front portion of the inner side surface 121, and the second protruding portion 142 is provided on the rear portion of the inner side surface 121. The first protruding portion 141 has a substantially trapezoidal shape as viewed from above, and the second protruding portion 142 has a substantially semi-circular shape as viewed from above. Lower ends of the protruding portions 141, 142 are connected to the first body 111. In other words, the protruding portions 141, 142 are provided to protrude laterally inward along an intersection between the inner side surface 121 and the bottom surface (i.e., upper surface of the first body portion 111) of the cover attachment recess portion 120.

As seen in FIG. 4, the third body portion 113 is provided to protrude frontward from the front end of the first body portion 111. The upper surface of the third body portion 113 is lower than the upper surface of the first body portion 111 so that a stepped portion is formed between the upper surface of the first body portion and the upper surface of the third body portion 113. A second engageable protruding portion 151 is provided on the front end portion of the pad body 100, that is, the third body portion 113. The second engageable protruding portion 151 is a protruding portion protruding upward from a laterally central portion of the upper surface of the third body portion 113; as viewed from the front, the second engageable protruding portion 151 has a substantially trapezoidal shape with the lateral width thereof being narrower toward upward. The rear end of the second engageable protruding portion 151 is connected to the first body portion 111. In other words, the second engageable protruding portion 151 is provided to protrude along an intersection between the upper surface of the third body portion 113 and the front surface of the first body portion 111.

The cover member 200 is a member configured to be disposed on the upper surface of the pad body 100 to form an air flow passage 21 (second air flow passage 21B) between the pad body 100 and the cover member 200. The cover member 200 includes a first cover member 210 disposed on the upper surface of the pad body 100, and a second cover member 220 disposed on the upper surface (i.e., occupant-side surface) of the first cover member 210. The first cover member 210 and the second cover member 220 may be made of the same material or different materials.

The first cover member 210 is a plate-like member having an air flow groove 230 that extends through the first cover member 210 in the upper-lower direction. The air flow groove 230 is a groove that forms a second air flow passage 21B. The air flow groove 230 includes a first groove portion 231, a second groove portion 232, and a third groove portion 233. As seen in FIG. 5, the first groove portion 231 is formed to have a substantially U-shaped configuration as viewed from above, and the second groove portion 232 extends rearward from the rear end of the laterally central portion of the first groove portion 231 at the center C1 of the seat cushion pad 20. The third groove portion 233 extends rightward from the rear end of the second groove portion 232; as viewed from above, the third groove portion 233 is superposed on the first ventilation hole 131 formed in the pad body 100.

First engageable recess portions 240 are provided substantially symmetrically in the lateral direction on the right and left side surfaces 211, 211 of the first cover member 210. Each of the first engageable recess portions 240 is a recess portion in which the first engageable protruding portion 140 formed on the pad body 100 is fitted. To be more specific, the first engageable recess portion 240 is a recess portion shaped to be recessed laterally inward as viewed from above; the first engageable recess portion 240 includes a first recess portion 241 and a second recess portion 242. The first recess portion 241 is a recess portion in which the first protruding portion 141 of the first engageable protruding portion 140 is fitted. The first recess portion 241 is provided on the front portion of each of the side surfaces 211. The second recess portion 242 is a recess portion in which the second protruding portion 142 of the first engageable protruding portion 140 is fitted. The second recess portion 242 is provided on the rear portion of the side surface 211. The first recess portion 241 in which the first protruding portion 141 is fitted has a substantially trapezoidal shape as viewed from above, and the second recess portion 242 in which the second protruding portion 142 has a substantially semi-circular shape as viewed from above. Accordingly, the first recess portion 241 and the second recess portion 242 are different in shape.

The first engageable protruding portions 140 and the first engageable recess portions 240 are located laterally inward of the side portions 20L, 20R when the first cover member 210 is disposed on the upper surface of the pad body 100. The first engageable protruding portions 140 and the first engageable recess portions 240 are provided laterally inward of the tuck-in grooves 27.

The first cover member 210 has a lower surface (i.e., a surface opposite to the occupant-side surface) fixed to the upper surface of the pad body 100. To be more specific, the first cover member 210 has a lower surface that is fixed to the bottom surface of the cover attachment recess portion 120 by adhesive 300 shown by hatching. It should be noted that in this embodiment, the right, left, front and rear side surfaces of the first cover member 210 are not fixed to the pad body 100 and the like. In other words, adhesive is not applied on the right, left, front and rear side surfaces of the first cover member 210.

In this embodiment, the thickness of the first cover member 210 in a direction in which the pad body 100 and the cover member 200 are laid one on top of another is substantially the same as the amount of protrusion (i.e., height) of the first engageable protruding portion 140 from the bottom surface of the cover attachment recess portion 120. In other words, according to this embodiment, the length of the first engageable recess portion 240 in the upper-lower direction is substantially the same as the height of the first engageable protruding portion 140. Furthermore, in this embodiment, the upper surface of the first engageable protruding portion 140 and the upper surface of the first cover member 210 are substantially flush with each other when the first engageable recess portion 240 and the first engageable protruding portion 140 are engaged with each other.

As seen in FIG. 4, the second cover member 220 is a plate-like member. The second cover member 220 includes a first portion 221 and a second portion 222 that is bent and extends downward from a front end of the first portion 221. In this embodiment, the lateral size of the first cover member 210 and the lateral size of the second cover member 220 are substantially the same.

The first portion 221 has a plurality of second ventilation holes 260 extending through the first portion 221 in the upper-lower direction. The second ventilation holes 260 are openings for forming third air flow passages 21C; as viewed from above, the second ventilation holes 260 are formed in positions superposed on the first groove portion 231 of the air flow groove 230 formed in the first cover member 210 (see FIG. 6).

A second engageable recess portion 251 is formed in a lower end portion of the second portion 222. The second engageable recess portion 251 is a recess portion in which the second engageable protruding portion 151 formed on the pad body 100 is fitted. To be more specific, the second engageable recess portion 251 is a recess portion that is recessed upward from a laterally central portion of the lower surface of the second portion 222; as viewed from the front, the second engageable recess portion 251 has a substantially trapezoidal shape.

Figure 6:
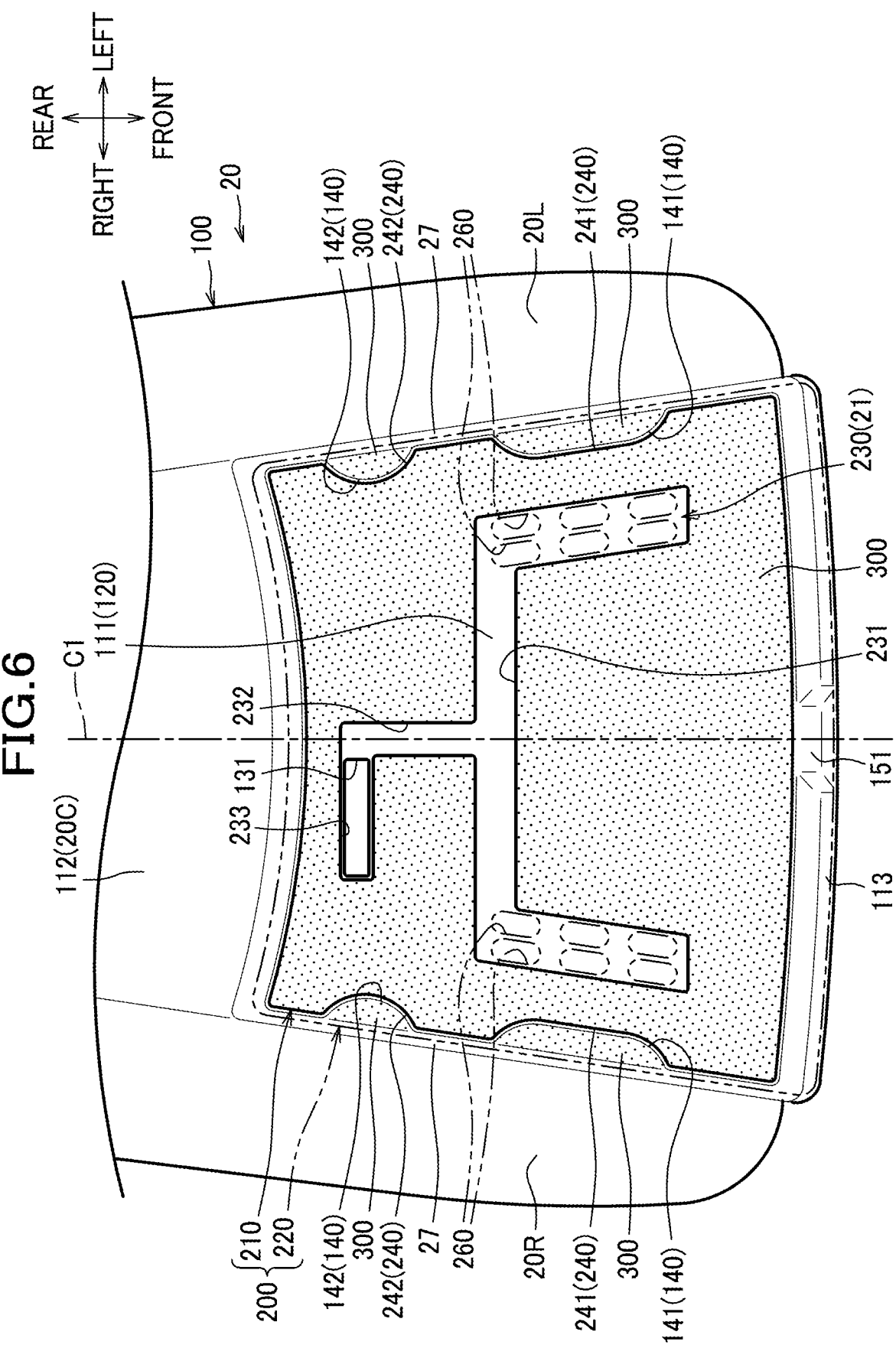
FIG. 6 is a top view of the front-side portion of the pad body, the first cover member, and the second cover member.

As seen in FIG. 6, the second cover member 220 has a lower surface (i.e., a surface opposite to the occupant-side surface) fixed to the upper surface of the first cover member 210 and to the upper surface of the pad body 100. To be more specific, the most of the lower surface of the second cover member 220 is fixed to the upper surface of the first cover member 210 by adhesive 300 shown by hatching. Further, portions of the lower surface of the second cover member 220 that are located on the first engageable protruding portions 140 formed on the pad body 100 are fixed to the upper surfaces of the first engageable protruding portions 140 by adhesive 300. Accordingly, the second cover member 220 is fixed to the first cover member 210 and to the pad body 100. It should be noted that in this embodiment, the right, left and rear surfaces of the second cover member 220 are not fixed to the pad body 100. In other words, adhesive is not applied on the right, left and rear surfaces of the second cover member 220. The lower surface of the front end portion (i.e., the second portion 222) of the second cover member 220 and the upper surface of the front end portion (i.e., the third body portion 113) of the pad body 100 may be fixed together or may not be fixed together.

To assemble the seat cushion pad 20 configured as described above, as seen in FIG. 4, adhesive is applied on the upper surface of the pad body 100, more specifically, the bottom surface of the cover attachment recess portion 120. The first cover member 210 is then disposed in the cover attachment recess portion 120 while the first engageable recess portions 240 are engaged with the first engageable protruding portions 140, and the lower surface of the first cover member 210 is fixed to the upper surface of the pad body 100 by adhesive. Next, adhesive is applied on the upper surface of the first cover member 210 and the upper surface of the first engageable protruding portion 140 that is formed on the pad body 100. Thereafter, the second cover member 220 is disposed on the first cover member 210, and the lower surface of the second cover member 220 is fixed to the upper surfaces of the first cover member 210 and the first engageable protruding portions 140 by adhesive. Accordingly, the seat cushion pad 20 can be assembled.

The assembly of the seat cushion pad 20 may be performed by any other methods not limited to the above-described method. For example, at first, the first cover member 210 and the second cover member 220 may be fixed by adhesive or the like to form the cover member 200, and then the thus obtained cover member 200 may be fixed to the pad body 100 by adhesive or the like to thereby assemble the seat cushion pad 20.

The car seat S used for the driver's seat has been described above. Next, a car seat S used for a passenger's seat will be described with respect to the configuration thereof, more specifically, the configuration of the pad body 100 and the cover member 200. In the following description, constituent elements similar to those previously described will be denoted by the same reference numerals and detailed description thereof will be omitted where appropriate; therefore, constituent elements different from those previously described will be described in detail.

Figure 7:
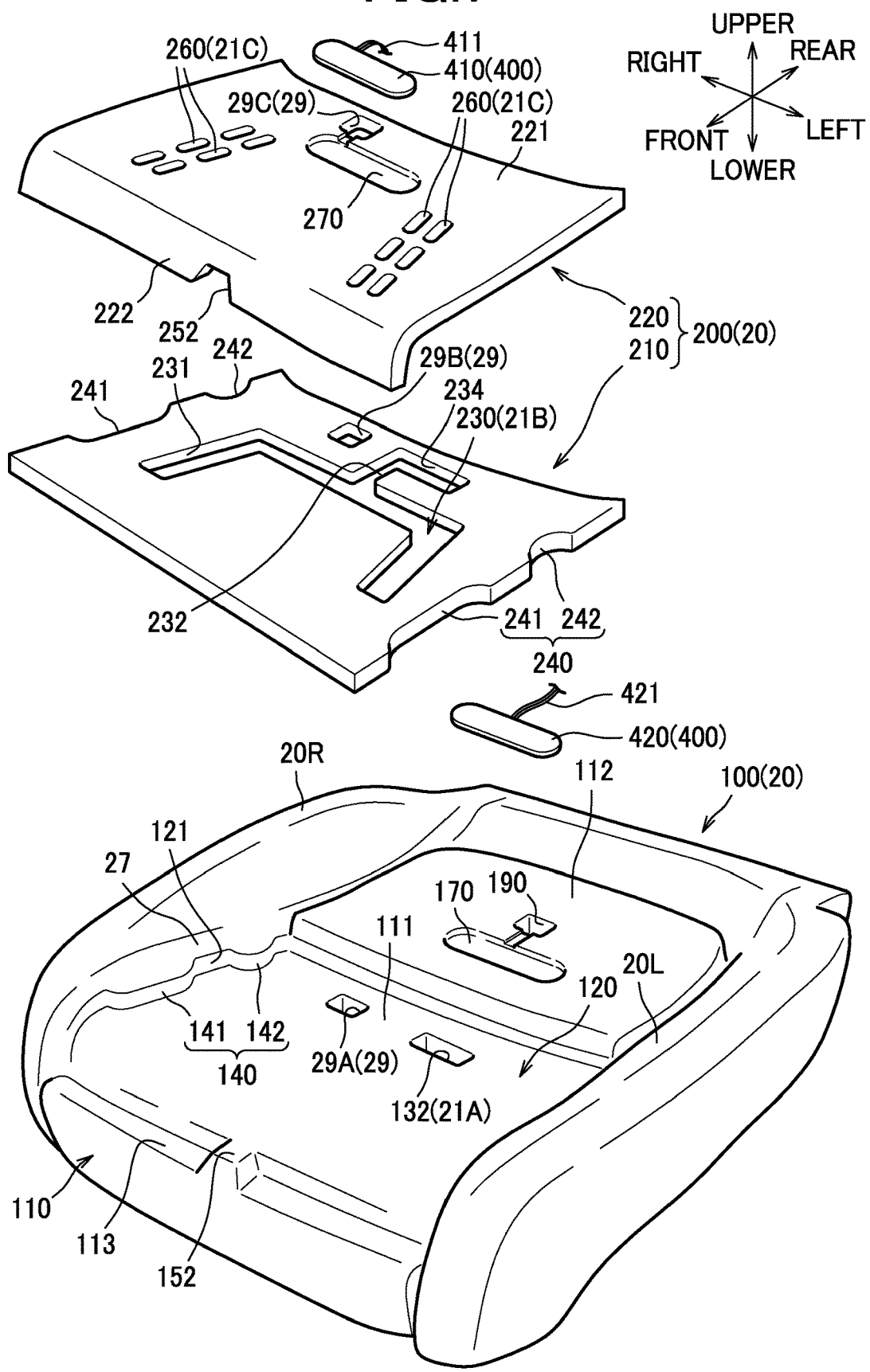
FIG. 7 is a perspective view of a pad body, a first cover member, a second cover member, and a seating sensor used for a passenger's seat.

As seen in FIG. 7, the pad body 100 for the passenger's seat has a first ventilation hole 132 extending through the pad boy 100 in the upper-lower direction at the rear portion of the first body portion 111. The first ventilation hole 132 is an opening for forming the first air flow passage 21A; contrary to the first ventilation hole 131 (see FIG. 4) of the pad body 100 for the driver's seat, the first ventilation hole 132 is located in a position shifted leftward from the center C1 of the seat cushion pad 20. The first cover member 210 for the passenger's seat has an air flow groove 230. The air flow groove 230 includes a first groove portion 231, a second groove portion 232, and a fourth groove portion 234. The fourth groove portion 234 extends leftward from the rear end of the second groove portion 232; as viewed from above, the fourth groove portion 234 is superposed on the first ventilation hole 132 of the pad body 100 (see also FIG. 15B).

The car seat S for the passenger's seat includes a seating sensor 400 configured to detect that an occupant sits on the car seat S, between the seat cushion pad 20 and the outer skin material (not shown). The seating sensor 400 includes a first seating sensor 410 disposed on the front side and a second seating sensor 420 disposed on the rear side.

A first sensor placement portion 270 in the form of a recess for receiving the first seating sensor 410 is provided on the upper surface of the second cover member 220. The seat cushion pad 20 has a first harness insertion hole 29 through which a wire harness 411 connected to the first seating sensor 410 is passed and pulled out to the lower side of the seat cushion pad 20. The first harness insertion hole 29 is formed with a first insertion hole 29A provided in the rear portion of the first body portion 111 of the pad body 100, a second insertion hole 29B provided in the rear portion of the first cover member 210, and a third insertion hole 29C provided in the rear portion of first portion 221 of the second cover member 220. The insertion holes 29A-29C are through holes extending in the upper-lower direction, and are superposed on each other as viewed from above. To be more specific, the insertion holes 29A-29C (i.e., the first harness insertion hole 29) are located in positions shifted rightward from the center C1 of the seat cushion pad 20. Furthermore, the first insertion hole 29A and the first ventilation hole 132 are arranged side-by-side in the lateral direction, and the second insertion hole 29B and the fourth groove portion 234 are arranged side-by-side in the lateral direction.

The second body portion 112 of the pad body 100 has an upper surface in which a second sensor placement portion 170 in the form of a recess for receiving the second seating sensor 420 is formed. The pad body 100 has a second harness insertion hole 190 extending through the pad body 100 in the upper-lower direction at the rear side of the second sensor placement portion 170. The second harness insertion hole 190 is an opening through which a wire harness 421 connected to the second seating sensor 420 is passed and pulled out to the lower side of the seat cushion pad 20.

A second engageable protruding portion 152 is provided on the third body portion 113 of the pad body 100. The second engageable protruding portion 152 is a protruding portion protruding upward from a laterally central portion of the upper surface of the third body portion 113; similar to the second engageable protruding portion 151 (see FIG. 4) of the pad body 100 for the driver's seat, as viewed from the front, the second engageable protruding portion 152 has a substantially trapezoidal shape with the lateral width thereof being narrower toward upward. The size (length in the lateral direction) of the second engageable protruding portion 152 is smaller than that of the second engageable protruding portion 151. Accordingly, the second engageable protruding portion 151 (as shown in FIG. 4) provided on the pad body 100 for the driver's seat and the second engageable protruding portion 152 (as shown in FIG. 7) provided on the pad body 100 for the passenger's seat are different in size according to specifications of the car seat S, specifically the location of the car seat S installed in the vehicle.

Further, the second portion 222 of the second cover member 220 has a lower end portion in which is formed a second engageable recess portion 252 in which the second engageable protruding portion 152 is fitted. Similar to the second engageable recess portion 251 of the pad body 100 for the driver's seat (see FIG. 4), the second engageable recess portion 252 has a substantially trapezoidal shape as viewed from the front. To allow the second engageable protruding portion 152 to be fitted in the second engageable recess portion 252, the size (length in the lateral direction) of the second engageable recess portion 252 is smaller than that of the second engageable recess portion 251. Accordingly, the second engageable recess portion 251 and the second engageable recess portion 252 are different in size according to the specifications of the car seat S.

<Structure for Attaching Blower and Duct>

Figure 8:
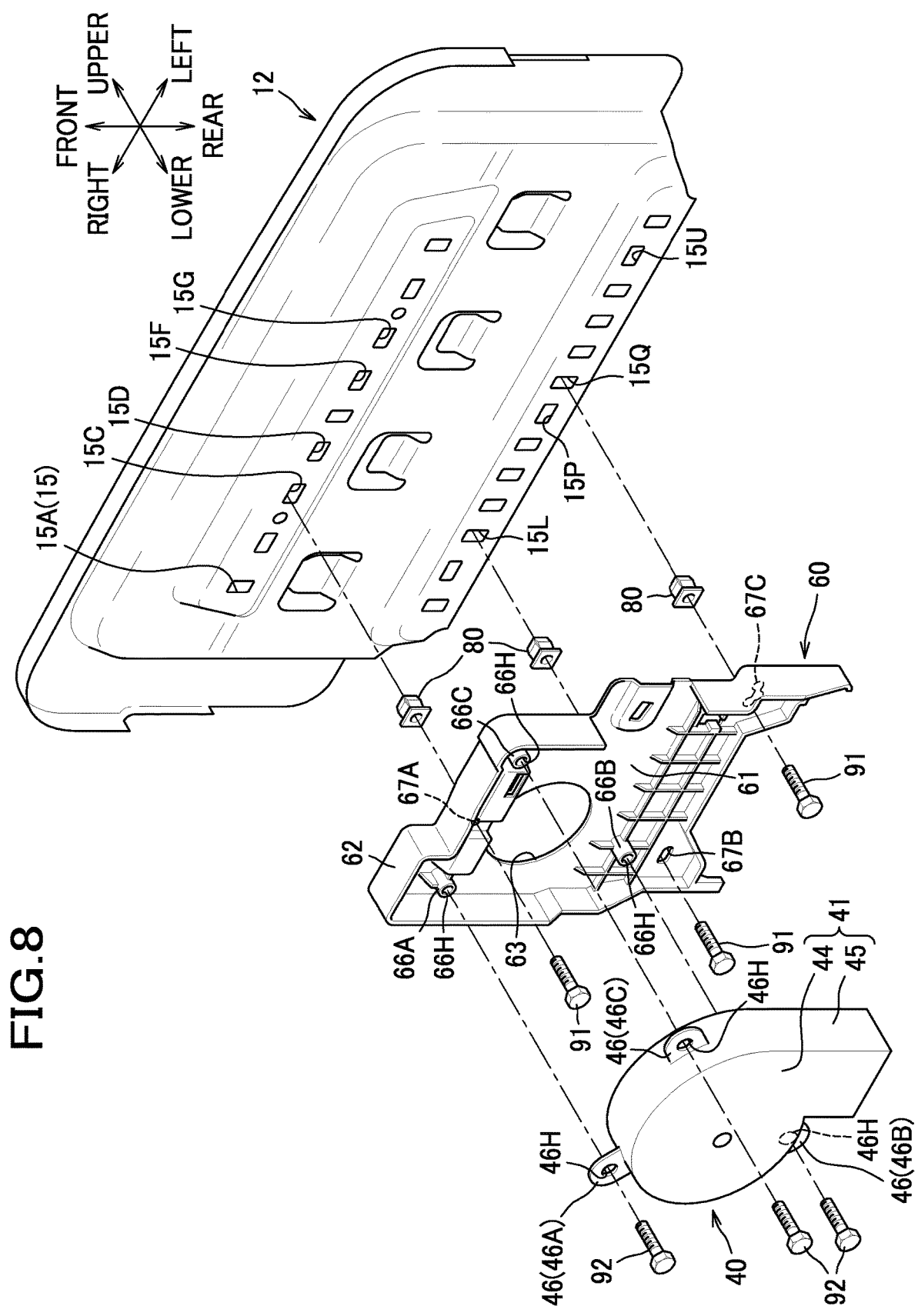
FIG. 8 is a perspective view of a pan frame, a bracket, and a blower.

As seen in FIG. 8, the casing 41 includes a casing body 44 having a substantially round shape, and a plate-like attachment portion 46 extending racially outward from the casing body 44. The attachment portion 46 includes a first attachment portion 46A, a second attachment portion 46B, and a third attachment portion 46C. The first attachment portion 46A is provided to extend in an obliquely frontward and rightward direction from the casing body 44, and the second attachment portion 46B is provided to extend approximately rearward from the casing body 44. The third attachment portion 46C is provided to extend in an obliquely frontward and leftward direction from the casing body 44. Each of the attachment portions 46A, 46B, 46C has a through hole 46H formed for insertion of a tapping screw 92.

Figure 9A:
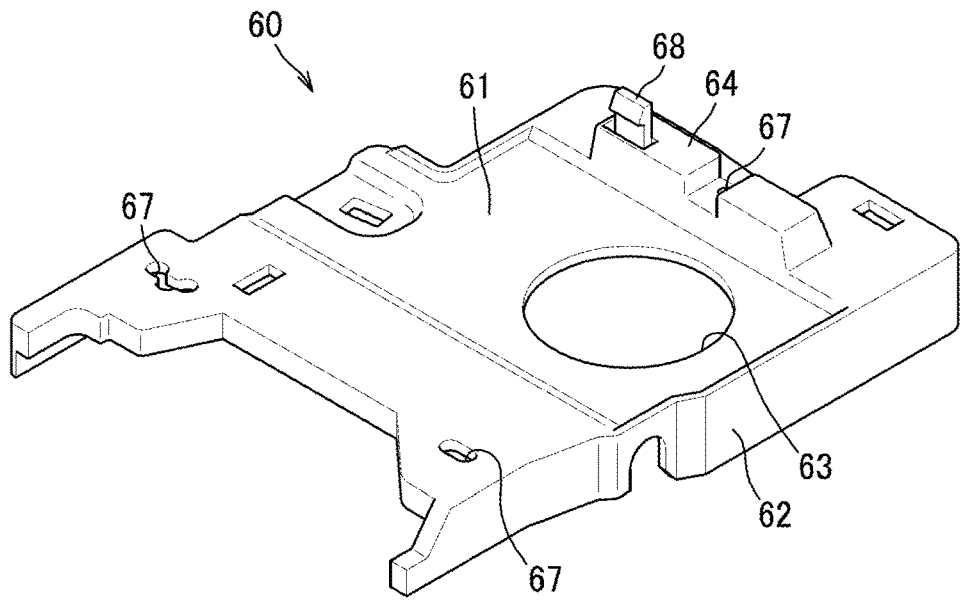
FIG. 9A is a perspective view of the bracket.
Figure 9B:
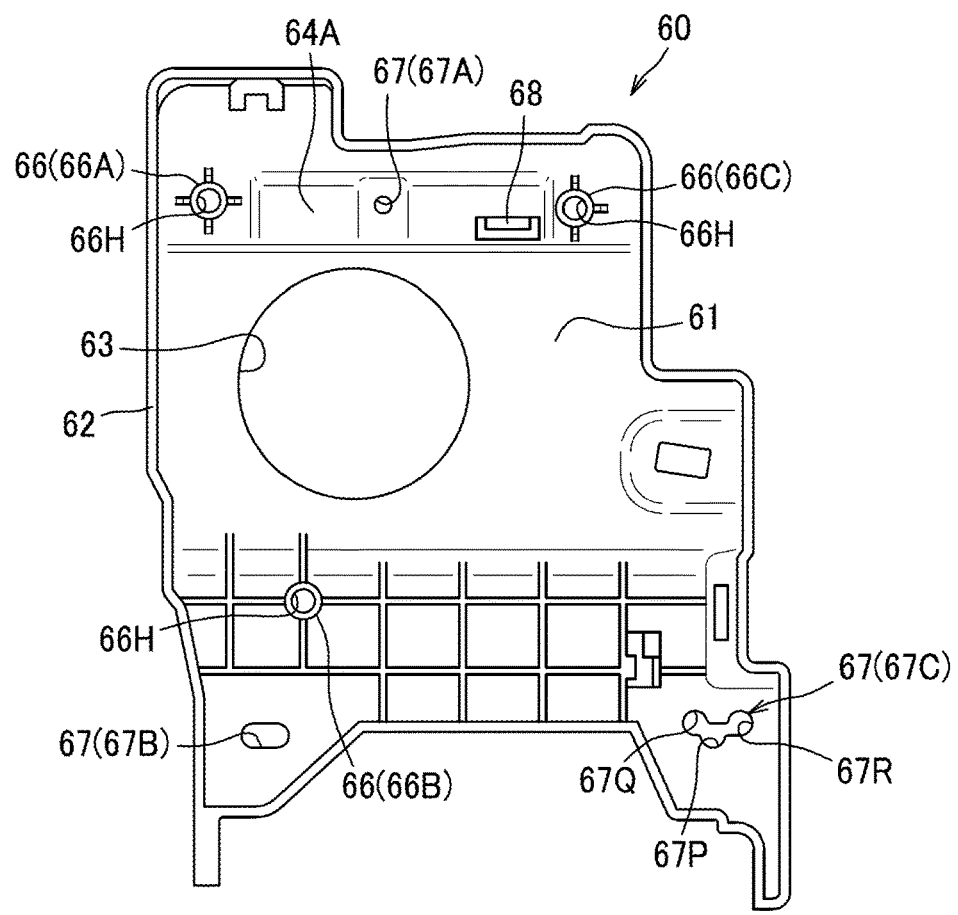
FIG. 9B is a view of the bracket as viewed from below.

As seen in FIGS. 9A and 9B, the bracket 60 is made of plastic such as polypropylene; the bracket 60 includes a base wall 61 and side walls 62 extending downward from peripheral edge portions of the base wall 61. The bracket 60 has a through opening 63, a hollow protruding portion 64, three projections 66, three attachment holes 67, and an engagement claw 68.

The through opening 63 is a circular opening extending through the base wall 61 in the upper-lower direction; the through opening 63 is formed in the base wall 61 at a position corresponding to the inlet opening 40A of the blower 40 (see also FIG. 2).

The protruding portion 64 is formed to protrude upward from the base wall 61 at a position frontward of the through opening 63.

The projections 66 are circular cylindrical portions protruding downward from the base wall 61 on a lower side of the base wall 51 where the blower 30 is located, and includes a first projection 66A, a second projection 66B, and a third projection 66C. The first projection 66A is provided at a position corresponding to the first attachment portion 46A of the blower 40 (see FIG. 8), and the second projection 66B is provided at a position corresponding to the second attachment portion 46B. The third projection 66C is provided at a position corresponding to the third attachment portion 46C. Furthermore, the first projection 66A and the third projection 66C are arranged to sandwich a recess portion 64A formed in a reverse side of the protruding portion 64. To be more specific, the first projection 66A is provided at the right side of the recess portion 64A, and the third projection 66C is provided at the left side of the recess portion 64A. The second projection 66B is provided at the rear side of the through opening 63. Each of the projections 66A, 66b, 66C has a screw hole 66H into which a tapping screw 92 (see FIG. 8) is driven. It should be noted that the screw holes 66H are pilot holes without female threads, and a tapping screw 92 taps a female thread therein as it is driven into the screw holes 66H. However, the screw holes 66H may have female threads formed in advance.

The attachment holes 67 are through openings extending in the upper-lower direction, and includes a first attachment hole 67A, a second attachment hole 67b, and a third attachment hole 67C. The first attachment hole 67A is a circular hole, and is formed in a laterally central portion of the protruding portion 64 formed between the projection 66A and the projection 66C. The second attachment hole 67B is an oblong elongated in the lateral direction, and is formed in the right side of the rear end portion of the base wall 61. The third attachment hole 67C is formed in the left side of the rear end portion of the base wall 61 so that the second attachment hole 67B and the third attachment hole 67C are arranged side-by-side in the lateral direction. The third attachment hole 67C consists of a first hole portion 67P, a second hole portion 67Q, and a third hole portion 67R each having a substantially circular shape. The first hole portion 67P is formed in a position substantially the same as the position of the second attachment hole 67B in the front-rear direction. The second hole portion 67Q is formed in a position obliquely frontward and rightward of the first hole portion 67P so as to be connected to the first hole portion 67P, and the third hole portion 67R is formed in a position obliquely frontward and leftward of the first hole portion 67P so as to be connected to the first hole portion 67P.

The engagement claw 68 is provided on the left end portion of the protruding portion 64, that is, on the left side of the first attachment hole 67A. The engagement claw 68 extends upward from the protruding portion 64, and has a distal portion protruding rearward; the engagement claw 68 has an L-shaped configuration as viewed from the side.

As seen in FIG. 10A, the pan frame 12 has a plurality of attachment holes 15 (15A-15V) used for attaching to the pan frame 12 various parts, such as wire harnesses (not shown) connected to the blower 40 and other electrical equipment, the bracket 60, and the like. The attachment holes 15A-15V are through holes extending through the pan frame 12 in the upper-lower direction, and are substantially the same in size. The attachment holes 15A-15I are formed in a central portion of the pan frame 12 in the front-rear direction; the attachment holes 15A-15I are arranged side-by-side in the lateral direction. The attachment holes 15J-15V are formed in a rear end portion of the pan frame 12; the attachment holes 15J-15V are arranged side-by-side in the lateral direction. Further, the attachment holes 15A, 15E, 15I, 15J, 15L-15O, 15Q-15T, 15V are formed to have a substantially rectangular shape elongated in the front-rear direction, and the attachment holes 15B-15D, 15F-15H, 15K, 15P, 15U are formed to have a substantially rectangular shape elongated in the lateral direction.

Figure 11A:
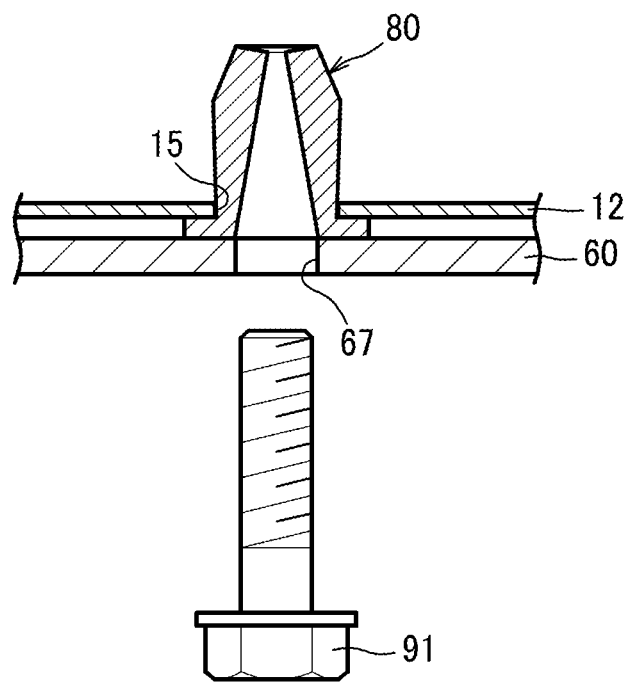
FIG. 11A is an explanatory view for explaining the manner of fixing the pan frame and the bracket.
Figure 11B:
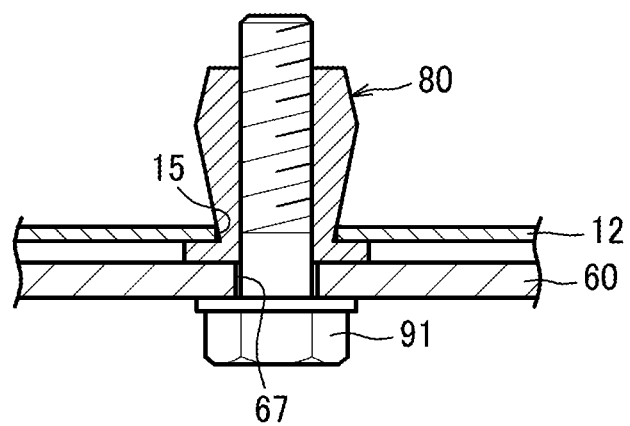
FIG. 11B is another explanatory view for explaining the manner of fixing the pan frame and the bracket.

As seen in FIGS. 11A and 11B, the bracket 60 is attached to the pan frame 12 by engaging a screw grommet 80 in the corresponding attachment hole 15 of the pan frame 12 and driving the tapping screw 91 through the attachment hole 67 of the bracket 60 into the screw grommet 80. Although not shown in the drawings, wire harnesses connected to the blower 40 and other electrical equipment are attached to the pan frame 12, for example, by providing the wire harnesses with harness clips retained thereon and engaging the harness clips into the corresponding attachment holes 15.

Figure 12:
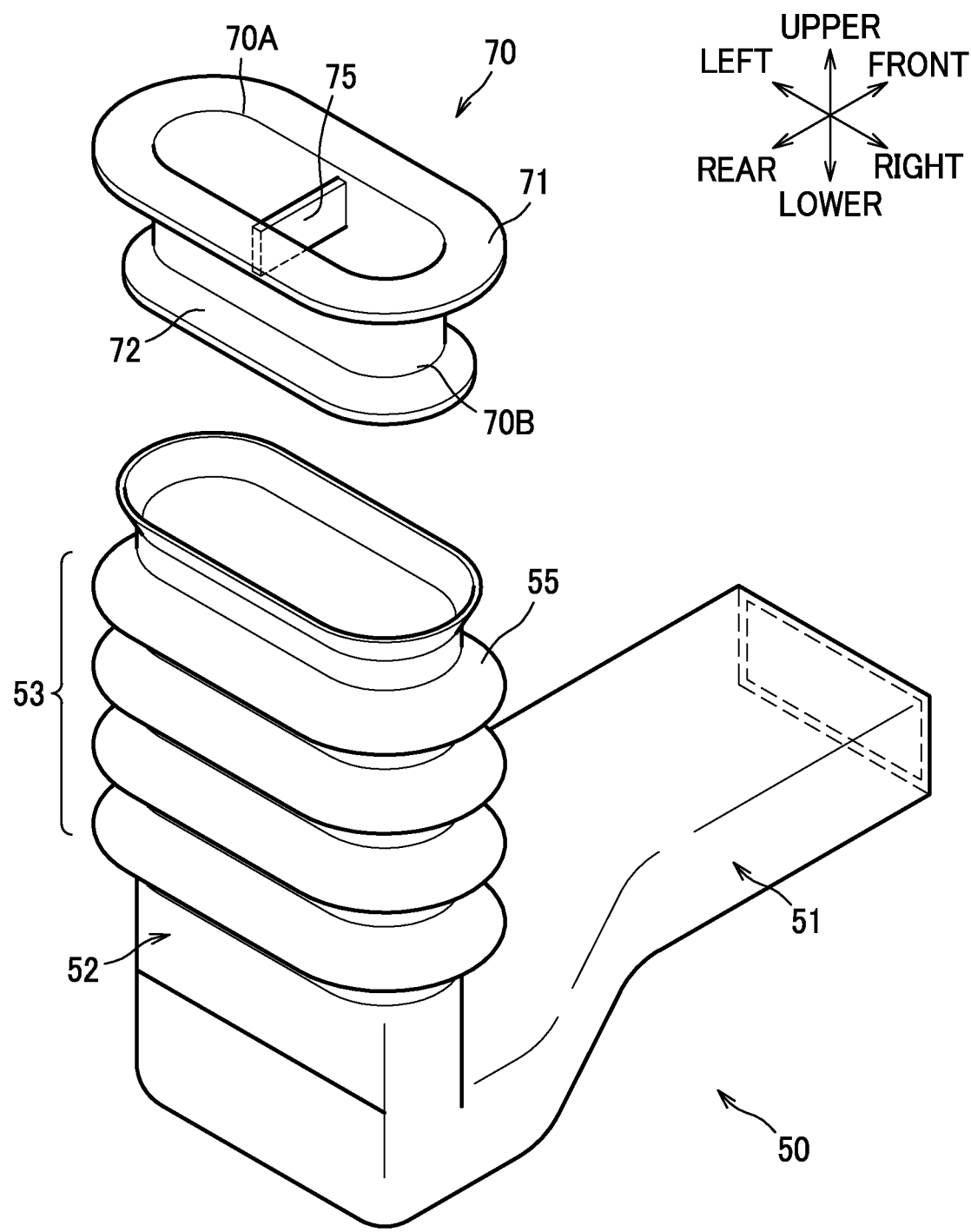
FIG. 12 is a perspective view showing a duct and a connecting member.

As seen in FIG. 2 and FIG. 12, the duct 50 is a pipe member by means of which the blower 40 communicates with the air flow passage 21 formed in the seat cushion pad 20. The duct 50 is made of a material such as olefinic elastomer (TPO). The duct 50 includes the first pipe portion 51 extending in the front-rear direction, and the second pipe portion 52 bent and extending upward from the rear end of the first pipe portion 51.

Figure 13:
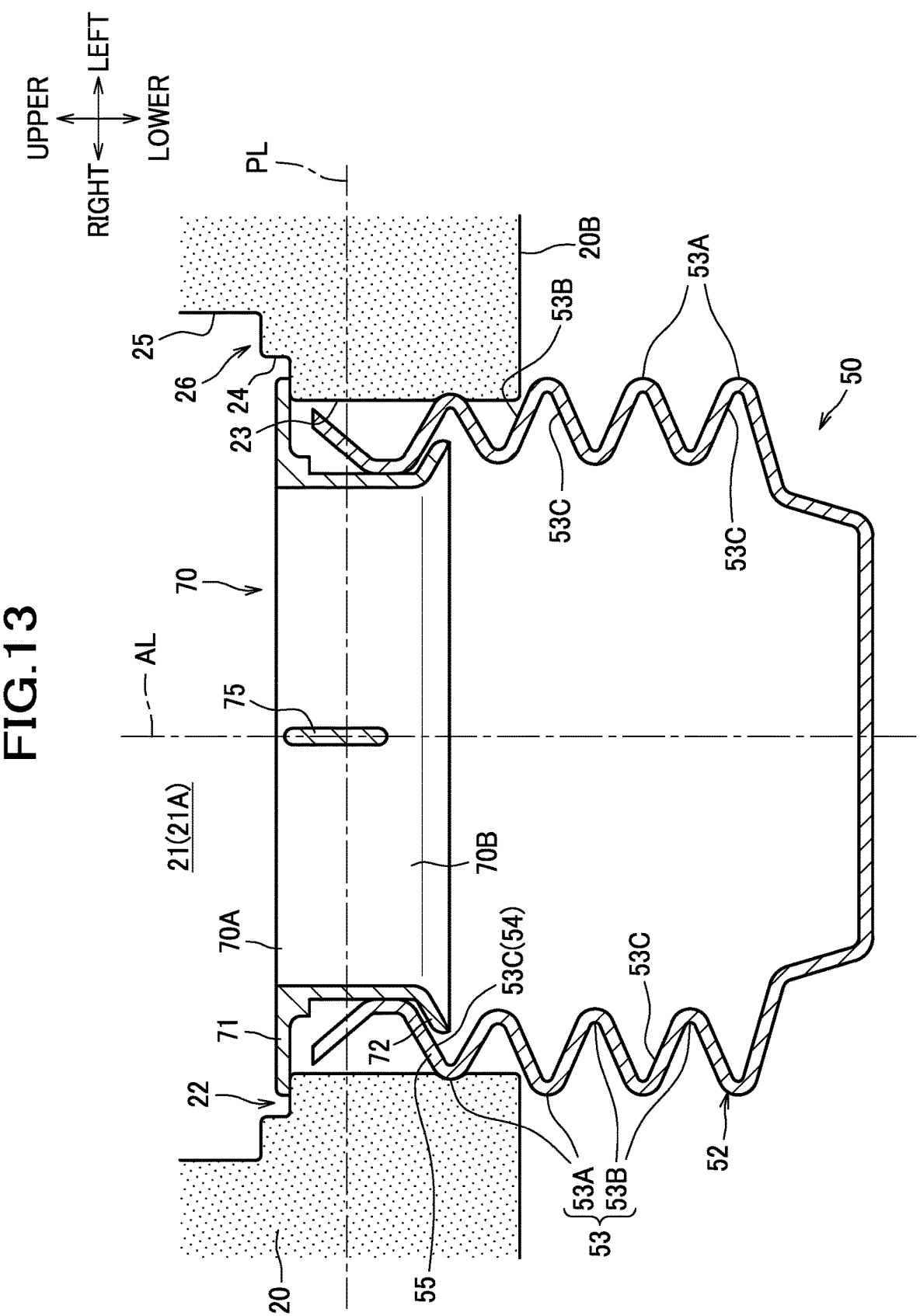
FIG. 13 is an enlarged sectional view of a seat cushion pad, the duct, and the connecting member as viewed from the front.

The second pipe portion 52 includes the bellows portion 53. As seen in FIG. 13, the bellows portion 53 has a crest portion 53A and a root portion 53B that are arranged alternately as viewed from the outside; the bellows portion 53 is configured to be flexible and capable of being extended and contracted. Further, a recess portion 54, on which a first flange 72 of the connecting member 70 which will be described later is caught, is formed on the inner surface of the second pipe portion 52. The recess portion 54 is formed on the inner surface of the bellows portion 53. To be more specific, the recess portion 54 is one of the plurality of root portions 53C of the bellows portion 53 at the inner surface of the duct 50; more specifically, the recess portion 54 is the uppermost root portion 53C.

As seen in FIG. 2, the duct 50 is connected to the outlet portion 45 of the blower 40 at the front end portion of the first pipe portion 51, and is connected to the seat cushion pad 20 at the upper end portion of the second pipe portion 52 through the connecting member 70.

As seen in FIGS. 12 and 13, the connecting member 70 is a tubular member configured to connect the duct 50 and the air flow passage 21 formed in the seat cushion pad 20. To be more specific, the cross-sectional shape of the connecting member 70 as taken along a plane PL perpendicular to an axial direction (i.e., direction in which the axis AL extends) of the tubular connecting member 70 has an elongate shape (more specifically, an oval shape elongated in the lateral direction).

The connecting member 70 includes, at a first end portion 70A that is an example of one end portion, a second flange 71 as a first stopper portion, and at a second end portion 70B that is an example of another end portion, a first flange 72 as a second stopper portion.

As seen in FIG. 13, the second flange 71 is a portion configured to be caught on the inner surface of the air flow passage 21. The second flange 71 is provided to protrude out from the outer peripheral surface of the first end portion 70A of the connecting member 70. A stepped portion 22, on which the second flange 71 is caught, is formed on the inner surface of the air flow passage 21 of the seat cushion pad 20. To be more specific, the air flow passage 21 (first air flow passage 21A) has an opening 23 connected to the outer surface (lower surface 20B) of the seat cushion pad 20, and a first radially enlarged portion 24 adjacent to the opening 23; as viewed from the axial direction of the connecting member 70, the size of the first radially enlarged portion 24 is larger than the size of the opening 23. The stepped portion 22 is a portion having a stepped shape formed between the opening 23 and the first radially enlarged portion 24.

As viewed from the axial direction of the connecting member 70, the size of the second flange 71 is larger than the size of the opening 23. In this embodiment, the first air flow passage 21A further includes a second radially enlarged portion 25 adjacent to the first radially enlarged portion 24; as viewed from the axial direction of the connecting member 70, the size of the second radially enlarged portion 25 is larger than the size of the first radially enlarged portion 24, so that a stepped shape (stepped portion 26) is also formed between the first radially enlarged portion 24 and the second radially enlarged portion 25. The second flange 71 may be configured such that as viewed from the axial direction of the connecting member 70, the second flange 71 is enlarged in size so as to be caught on the stepped portion 26.

The first flange 72 is a stopper portion configured to be caught on the recess portion 54 formed on the inner surface of the duct 50. The first flange 72 is provided to protrude out from the outer peripheral surface of the second end portion 70B of the connecting member 70. To be more specific, the first flange 72 is formed to have an obliquely extending funnel shape directed away from the second flange 71 with increasing distance from the proximal end of the first flange 71 and decreasing distance to the distal end of the first flange 71. With this configuration, the first flange 72 extends generally along a wall 55 that forms the uppermost root portion 53C (recess portion 54) of the bellows portion 53.

The whole connecting member 70 including the first end portion 70A is disposed within the air flow passage 21, and the second end portion 70B is connected to the duct 50. To be more specific, the connecting member 70 is connected to the duct 50 with the second end portion 70B being inserted in the duct 50. The upper end portion of the duct 50 together with the connecting member 70 is disposed within the air flow passage 21. With this configuration of the duct 50, the uppermost crest portion 53A of the bellows portion 53 that is formed on the reverse side of the recess portion 54 (53C) is disposed within the air flow passage 21. Further, the top portion of the uppermost crest portion 53A of the duct 50 is embedded into and thus in contact with the inner surface of the air flow passage 21 (i.e., the seat cushion pad 20).

As seen in FIGS. 12 and 13, the connecting member 70 includes a reinforcement portion 75 disposed within the tubular connecting member 70. To be more specific, the reinforcement portion 75 is a wall portion provided within the tubular connecting member 70 and extending in a transverse direction (substantially in the front-rear direction) of the oval cross-sectional shape of the connecting member 70. The reinforcement portion 75 is provided at center in a direction of the length (i.e., laterally direction) of the cross-sectional shape of the connecting member 70 so as to bridge between and connect a plurality of portions (more specifically, two portions) on the inner surface of the connecting member 70. The reinforcement portion 75 is provided in a position closer to the first end portion 70A than to the second end portion 70B; in other words, the reinforcement portion 75 is provided in a position shifted to the first end portion 70A.

One example of the attachment of the blower 40 to the pan frame 12 will be described.

As seen in FIG. 8, to attach the blower 40 to the pan frame 12, the bracket 60 is first attached to the pan frame 12. To be more specific, the screw grommets 80 are engaged in and thus attached to the corresponding attachment holes 15C, 15L, 15Q of the pan frame 12. The engageable claw 68 of the bracket 60 (see FIG. 9A) is then hooked in the attachment hole 15D that is formed adjacently on the left side of the attachment hole 15C, to temporarily retain the bracket 60. Thereafter, a tapping screw 91 is inserted through the attachment hole 67A of the bracket 60 and driven into the screw grommet 80 engaged in the attachment hole 15C. Other tapping screws 91 are inserted through the attachment holes 67B, 67C of the bracket 60 and driven into the screw grommets 80 engaged in the attachment holes 15L, 15Q.

Meanwhile, the blower 40 is connected to the duct 50 by fitting the front end portion of the duct 50 (see FIG. 12) onto the outlet portion 45 of the blower 40. Further, as seen in FIG. 13, the connecting member 70 is attached to the duct 50 by inserting the second end portion 70B of the connecting member 70 into the upper end portion of the duct 50 and engaging the first flange 72 and the recess portion 54.

Thereafter, the blower 40 is attached to the bracket 60, and the duct 50 and the seat cushion pad 20 are connected together through the connecting member 70. To be more specific, as seen in FIG. 8, the tapping screws 92 are inserted through the through holes 46H formed in the attachment portions 46A, 46B, 46C of the blower 40 and driven into the screw holes 66H formed in the projections 66A, 66B, 66C of the bracket 60. Further, as seen in FIG. 13, the connecting member 70 is inserted within the air flow passage 21 of the seat cushion pad 20, and causes the second flange 71 to be engaged with and thus caught on the stepped portion 22.

Accordingly, the blower 40 is attached to the pan frame 12 through the bracket 60, and the duct 50 is connected to the seat cushion pad 20 through the connecting member 70, so that the blower 40 and the air flow passage 21 communicate with each other through the duct 50.

The pan frame 12, the blower 40, the bracket 60, and the connecting member 70 used in this embodiment are configured as common parts for the driver's seat and the passenger's seat of the automobile, and the car seat S used for the driver's seat has been described above. To explain further, as seen in FIG. 10A, the car seat S used for the driver's seat is configured such that the opening 23 of the air flow passage 21 is formed in a position shifted rightward from the lateral center of the car seat S (see alternate long and short dashed lines C2) and that the bracket 60 is attached to a position shifted rightward from the lateral center of the car seat S.

More specifically, to attach the bracket 60 to the pan frame 12 in the car seat S used for the driver's seat, the attachment holes 15C, 15L, 15Q are used as described above. To be more specific, the bracket 60 is attached to the pan frame 12 by inserting the first tapping screw 91 through the first attachment hole 67A and driving into the screw grommet 80 engaged in the attachment hole 15C, then inserting the second tapping screw 91 through the second attachment hole 67B and driving into the screw grommet 80 engaged in the attachment hole 15L, and thereafter inserting the third tapping screw 91 through the third attachment hole 67C and driving into the screw grommet 80 engaged in the attachment hole 15Q.

At this time, as seen in FIG. 10B, the shank of the tapping screw 91 is positioned in the laterally central portion of the second attachment hole 67B. Further, as seen in FIG. 10C, the shank of the tapping screw 91 is fitted in the first hole portion 67P of the third attachment hole 67C. Since the second attachment hole 67B is an oblong hole elongated in the lateral direction, even if the position of the attachment hole 15L is slightly shifted in the lateral direction, such an undesirable shift can be absorbed.

As seen in FIG. 14A, the car seat S used for the passenger's seat is configured such that the opening 23 of the air flow passage 21 is formed in a position shifted leftward from the center of the car seat S (see alternate long and short dashed lines C2). Therefore, in the car seat S used for the passenger's seat, the bracket 60 is attached to a position shifted leftward from the center of the car seat S.

More specifically, to attach the bracket 60 to the pan frame 12 in the car seat S used for the passenger's seat, the attachment holes 15F, 15P, 15U are used. To be more specific, the bracket 60 is attached to the pan frame 12 by inserting the first tapping screw 91 through the first attachment hole 67A and driving into the screw grommet 80 engaged in the attachment hole 15F, then inserting the second tapping screw 91 through the second attachment hole 67B and driving into the screw grommet 80 engaged in the attachment hole 15P, and thereafter inserting the third tapping screw 91 through the third attachment hole 67C and driving into the screw grommet 80 engaged in the attachment hole 15U.

At this time, as seen in FIG. 14B, the shank of the tapping screw 91 is positioned in or around the left end portion of the second attachment hole 67B. Further, as seen in FIG. 14C, the shank of the tapping screw 91 is fitted in the second hole portion 67Q of the third attachment hole 67C. Although the attachment hole 15U is formed in a position shifted slightly frontward of the attachment hole 15P, such an undesirable shift can be absorbed because the second hole portion 67Q of the third attachment hole 67C is formed in a position obliquely frontward of the first hole portion 67P.

It should be noted that the duct 50 used for the driver's seat and the duct 50 used for the passenger's seat are slightly different in shape of the first pipe portion 51 (see FIG. 12) but substantially the same in configuration of the second pipe portion 52.

<Advantageous Effects of Embodiment>

According to this embodiment described above, the first cover member 210 is fixed to the pad body 100, and the second cover member 220 is fixed to the first cover member 210 and to the pad body 100, so that the pad body 100, the first cover member 210, and the second cover member 220 are fixed one another; therefore, the seat cushion pad 20 consisting of a plurality of parts can be firmly combined together. To be more specific, since the second cover member 220 is fixed to the first cover member 210 and to the pad body 100, the unity of the seat cushion pad 20 can be improved. Further, since the first cover member 210 is fixed to the pad body 100 and to the second cover member 220, the unity of the seat cushion pad 20 can be improved with this configuration. Furthermore, since the pad body 100 is fixed to the first cover member 210 and to the second cover member 220, the unity of the seat cushion pad 20 can also be improved with this configuration.

The lower surface of the first cover member 210 is fixed to the upper surface of the pad body 100 and the lower surface of the second cover member 220 is fixed to the upper surface of the first cover member 210 and to the upper surface of the pad body 100, so that the upper and lower surfaces to which a force is applied, for example, when an occupant sits on the car seat S are fixed to each other; therefore, the seat cushion pad 20 consisting of the plurality of parts can be more firmly combined together. Further, the second cover member 220 is placed on the upper surface of the first cover member 210 and on the upper surface of the pad body 100, so that the second cover member 220 can be supported by the pad body 100. This makes it possible to prevent the first cover member 210 from collapsing excessively and thus to suppress narrowing of the air flow passage 21 (i.e., the second air flow passage 21B) for instance.

The first engageable protruding portion 140 is provided on the pad body 100 and the first engageable recess portion 240 is provided on the first cover member 210, so that the pad body 100 and the cover member 200 can be positioned with ease by engaging the first engageable protruding portion 140 and the first engageable recess portion 240 when the cover member 200 is disposed on the pad body 100.

The lower surface of the second cover member 220 is fixed to the upper surface of the first engageable protruding portion 140 provided on the pad body 100, so that the boundary between the first engageable protruding portion 140 and the first engageable recess portion 240 that may form a gap of the seat cushion pad 20 consisting of the plurality of parts can be covered with the second cover member 220. This makes it possible to improve the feel of seating of the car seat S because an occupant seated on the car seat S is less likely to feel such a gap formed by the boundary between the first engageable protruding portion 140 and the first engageable recess portion 240.

The first engageable protruding portion 140 includes a plurality of portions including the first protruding portion 141 and the second protruding portion 142, and the first engageable recess portion 240 includes a plurality of portions including the first recess portion 241 and the second recess portion 242. Accordingly, the pad body 100 and the cover member 200 can be positioned accurately by the engagement of the first engageable protruding portion 140 and the first engageable recess portion 240.

The first protruding portion 141 and the second protruding portion 142 are different in shape and the first recess portion 241 and the second recess portion 242 are different in shape, so that wrong assembly of the pad body 100 and the cover member 200 can be avoided; the first engageable protruding portion 140 and the first engageable recess portion 240 do not engage properly, for example, if the first cover member 210 is disposed on the pad body 100 in a wrong orientation, front side back or inside out (upside down).

Since the first engageable protruding portion 140 and the first engageable recess portion 240 are arranged laterally inward of the side portions 20L, 20R, the first engageable protruding portion 140 and the first engageable recess portion 240 are arranged on the central portion 20C that is flatter than the side portions 20L, 20R; therefore, as compared with an alternative configuration in which the first engageable protruding portion and the first engageable recess portion are arranged, for example, on slanted surfaces of the side portions 20L, 20R, the seat cushion pad 20 can be designed in a simple structure.

The second engageable protruding portions 151, 152 are provided on the pad body 100 and the second engageable recess portions 251, 252 are provided on the second cover member 220. With this configuration, the pad body 100 and the cover member 200 can be positioned with ease by engaging the second engageable protruding portions 151, 152 with the second engageable recess portions 251, 252 when the cover member 200 is disposed on the pad body 100. Further, according to this embodiment, since the first engageable protruding portion 140 is provided on the pad body 100 and the first engageable recess portion 240 is provided on the first cover member 210, the pad body 100 and the cover member 200 can be positioned more accurately by further providing the second engageable protruding portion 151, 152 and the second engageable recess portion 251, 252.

Further, the second engageable protruding portion 151, 152 and the second engageable recess portion 251, 252 are different in size between the car seat S for the driver's seat and the car seat S for the passenger's seat. With this configuration, for example, if the second cover member 220 used for the passenger's seat is placed on the pad body 100 for the driver's seat, the second engageable protruding portion 151 and the second engageable recess portion 252 do not engage properly; therefore, wrong assembly of the pad body 100 and the cover member 200 having different specifications can be avoided.

Since the connecting member 70 has the first flange 72 as a second stopper portion configured to be caught on the duct 50, the engagement between the first flange 72 of the connecting member 70 and the recess portion 54 of the duct 50 can prevent the duct 50 from coming off the connecting member 70. Further, since the connecting member 70 has the second flange 71 as a first stopper portion configured to be caught on the inner surface of the air flow passage 21, the engagement between the second flange 71 of the connecting member 70 and the stepped portion 22 formed on the inner surface of the air flow passage 21 can prevent the connecting member 70 together with the duct 50 from coming off the seat cushion pad 20.

Since the second end portion 70B of the connecting member 70 is inserted in the duct 50, and the first flange 72 as the second stopper portion is caught on the inner surface of the duct 50, the connecting member 70 can be reduced in size as compared with an alternative configuration in which the duct 50 is inserted in a tubular connecting member and the second stopper portion is caught on the outer surface of the duct 50.

Since the recess portion 54 on which the first flange 72 is caught is formed on the inner surface of the duct 50, the duct 50 from coming off the connecting member 70 can be prevented with a simple configuration.

Since the duct 50 has an extendable and contractible bellows portion 53 and the recess portion 54 is formed on the bellows portion 53, the extendable and contractible bellows portion 53 can absorb shaking, vibration and the like, thereby further preventing the duct 50 from coming off the connecting member 70.

Since the recess portion 54 is formed by the root portion 53C of the bellows portion 53, the duct 50 can be designed in a simple structure as compared with an alternative configuration in which the inner peripheral surface of the bellows portion 53 is provided with a recess portion, on which the first flange 72 is caught, in addition to the root portion 53C.

The first flange 72 extends along the wall 55 that forms the root portion 53C (recess portion 54) of the bellows portion 53 at the inner surface of the duct 50. This configuration makes the edge of the first flange 72 less likely to scratch the wall 55, thereby suppressing the damage on the duct 50. Further, since the second stopper portion is shaped like a flange, the first flange 72 can be made to contact the inner surface of the duct 50 along the entire perimeter of the first flange 72, so that the close contactability between the connecting member 70 and the duct 50 can be increased and the leakage of air can be suppressed.

Since the duct is configured such that the uppermost crest portion 53A of the bellows portion 53 is disposed within the air flow passage 21 and in contact with the inner surface of the air flow passage 21, motion of the duct 50 can be restricted by the seat cushion pad 20. This can further prevent the duct 50 from coming off the connecting member 70.

Since the connecting member 70 has the reinforcement portion 75, collapsing deformation of the tubular connecting member 70 can be suppressed. Further, since the deformation of the connecting member 70 can be suppressed, the duct 50 can further be prevented from coming off the connecting member 70 and sufficient path of air within the seat cushion S1 can be ensured.

Since the reinforcement portion 75 is disposed in the longitudinally central portion of the oval cross-sectional shape of the connecting member 70, collapsing deformation of the tubular connecting member 70 can further be suppressed. This configuration makes it possible to further prevent the duct from coming off the connecting member 70, and to ensure more sufficient path of air within the seat cushion S1.

Since the reinforcement portion 75 is provided in a position shifted toward the first end portion 70A where the second flange 71 is formed, collapsing deformation of the connecting member 70 at the first end portion 70A side can be suppressed effectively. This can prevent the connecting member 70 from coming off the seat cushion pad 20.

Further, since the stepped portion 22, on which the second flange 71 of the connecting member 70 is caught, is formed on the inner surface of the air flow passage 21, the connecting member 70 can be attached to the seat cushion pad 20 with ease only by inserting the connecting member 70 in the air flow passage 21 and thereafter engaging the second flange 71 with the stepped portion 22. Further, since the first stopper portion is shaped like a flange, the second flange 71 can be made to contact the inner surface of the air flow passage 21 along the entire perimeter of the second flange 71, so that the close contactability between the connecting member 70 and the seat cushion pad 20 can be increased and the leakage of air can be suppressed.

<Modified Embodiment>

Although one preferred embodiment of the present invention has been described above, the present invention is not limited to the above-described embodiment. It is to be understood that various changes and modifications may be made to any of the specific configurations where necessary without departing from the gist of the present invention.

Figure 15A:
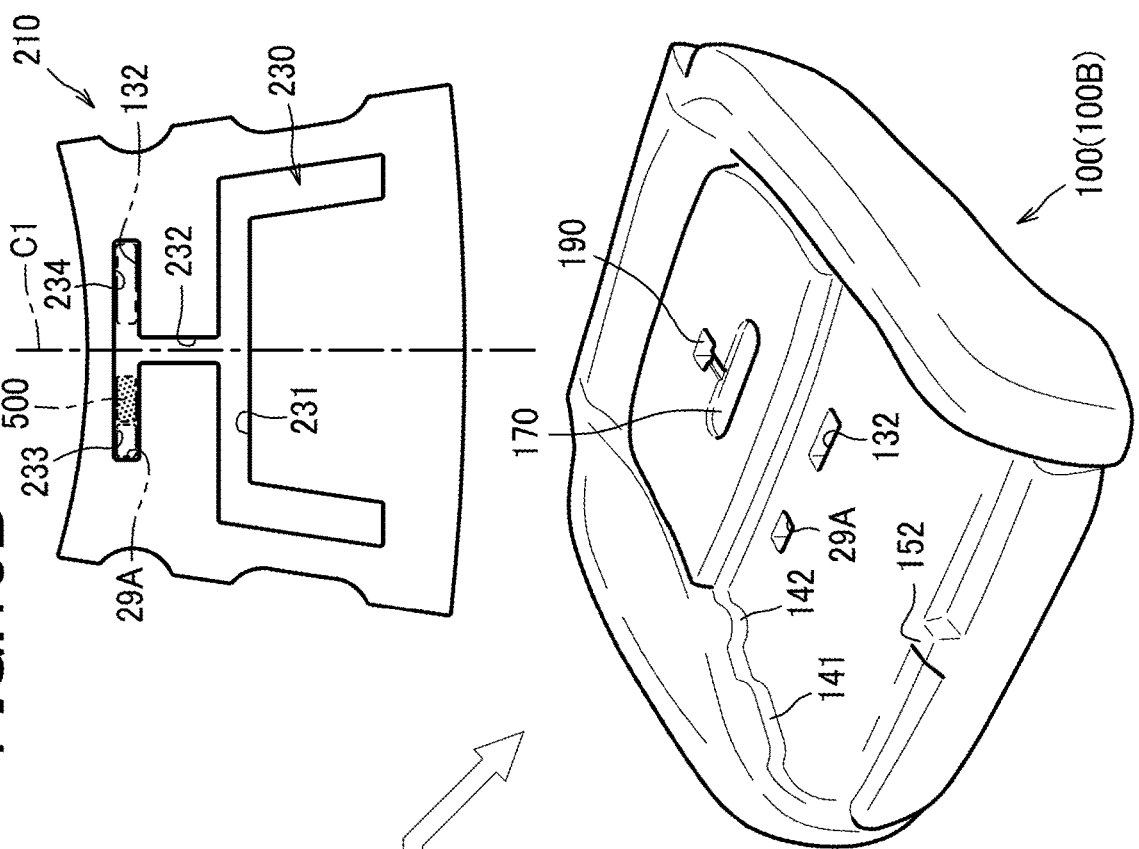
FIG. 15A is a perspective view of a first cover member, a pad body used for the driver's seat, and a pad body used for the passenger's seat according to a modified embodiment.
Figure 15B:
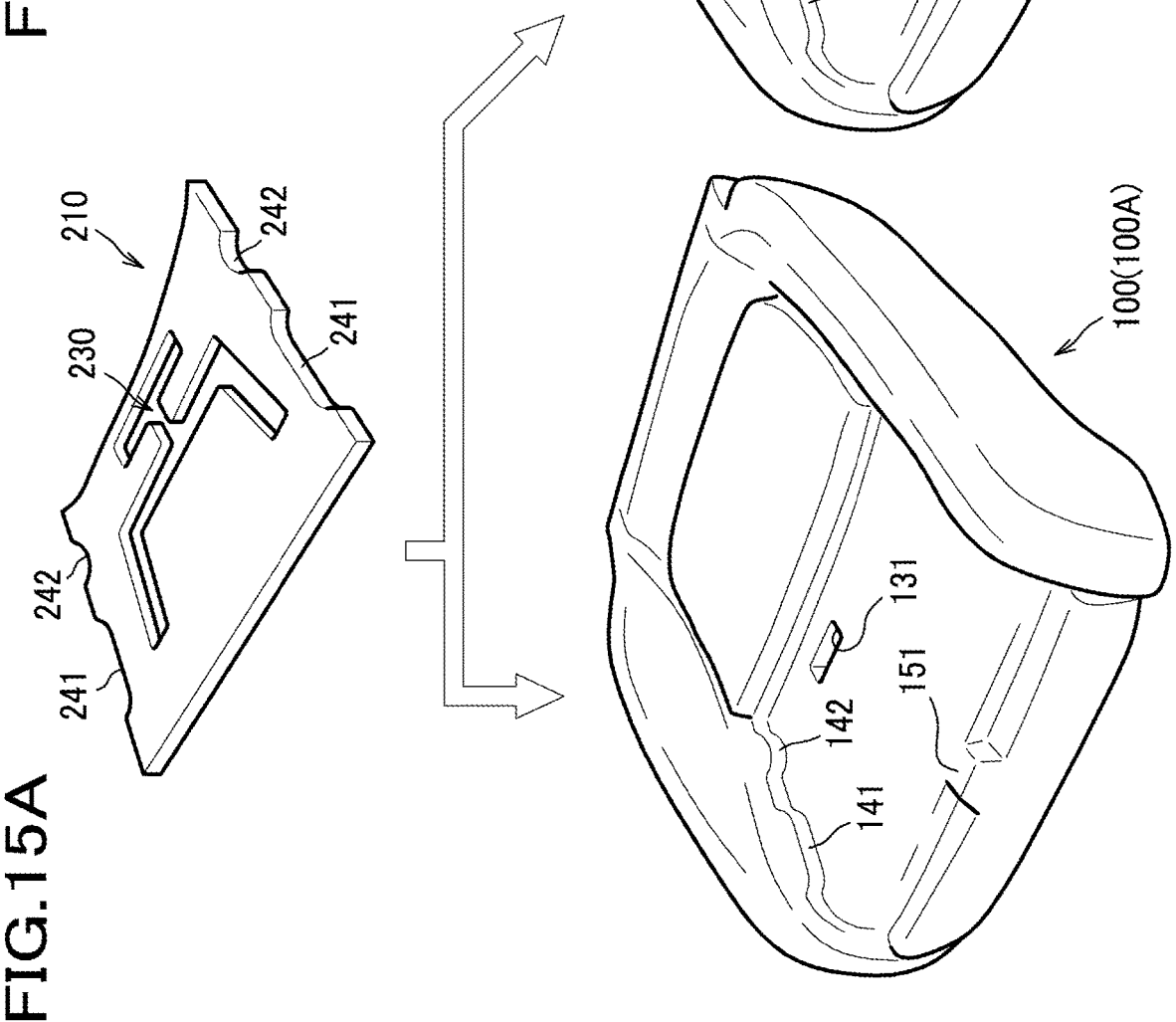
FIG. 15B is a top view of the first cover member.

For example, in the above-described embodiment, the first cover member 210 for the driver's seat as shown in FIG. 4 and the first cover member 210 for the passenger's seat as shown in FIG. 7 are provided as dedicated members. However, the present invention is not limited to this specific configuration. As seen in FIGS. 15A and 15B, the first cover member 210 may be provided as a common part used for the driver's seat and the passenger's seat. The common first cover member 210 has an air flow groove 230. The air flow groove 230 includes a first groove portion 231, a second groove portion 232, a third groove portion 233, and a fourth groove portion 234; these groove portions 232-234 form a T-shaped groove as viewed from above. When the common first cover member 210 is used and placed on the pad body 100B for the passenger's seat, the third groove portion 233 is closed by fitting, for example, a seal member 500 made of the same material as that of the first cover member 210 into at least a portion of the third groove portion 233. At this time, the position of the third groove portion 233 corresponding to the first insertion hole 29A and the third insertion hole 29C (see FIG. 7) should not be closed. Accordingly, a hole through which the wire harness 411 passes can be formed by a portion of the third groove portion 233 that extends through the common first cover member 210 in the upper-lower direction, the first insertion hole 29A, and the third insertion hole 29C. When the common first cover member 210 is used and placed on the pad body 100A for the driver's seat, the fourth groove portion 234 may be closed by a seal member so as to prevent air from flowing into the forth groove portion 234.

Figure 16A:
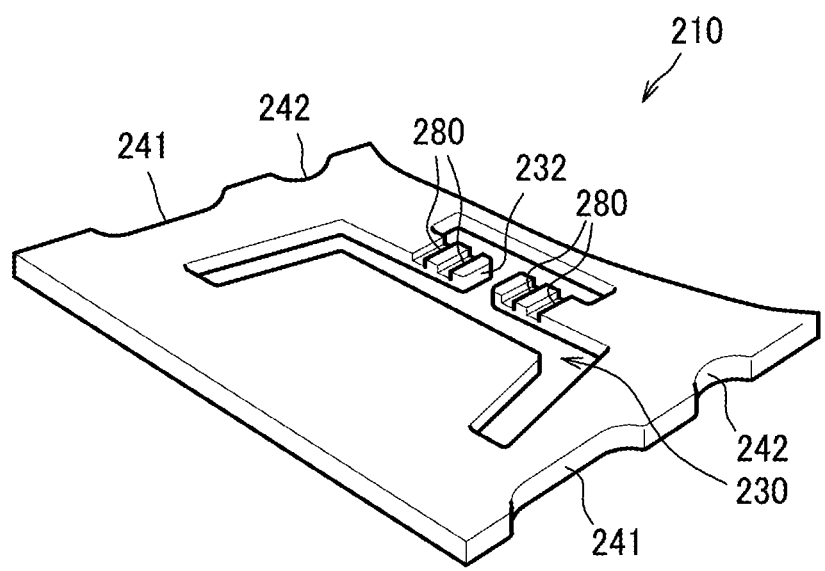
FIG. 16A is a perspective view of a first cover member according to another modified embodiment.
Figure 16B:
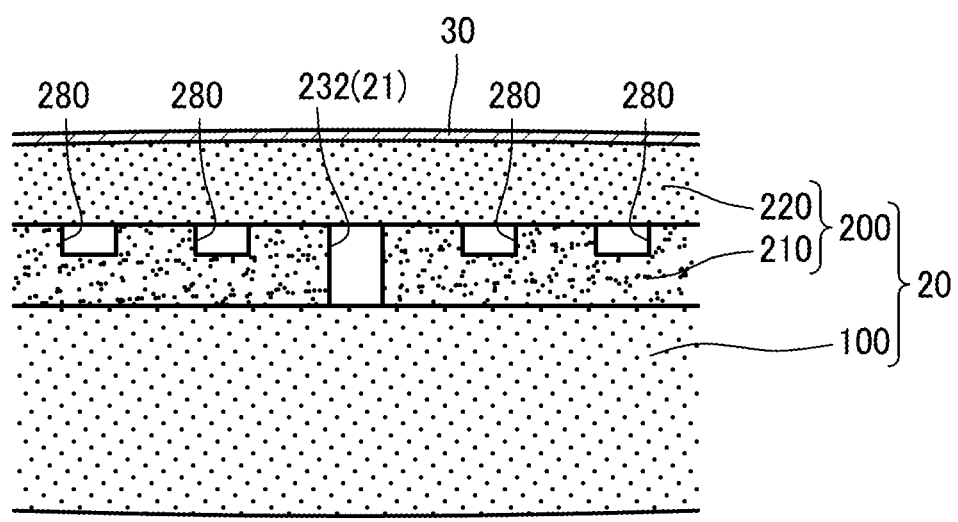
FIG. 16B is an enlarged sectional view showing the structure around a second groove portion of the seat cushion as viewed from the front.

Further, as seen in FIGS. 16A and 16B, the first cover portion 210 may be configured such that a plurality of grooves 280 may be provided outside the air flow groove 230 (air flow passage 21). In the embodiment shown in FIGS. 16A and 16B, the grooves 280 are formed on the upper surface of the first cover member 210 at positions outside the second groove portion 232 that forms the air flow groove 230 by way of example. To be more specific, each of the grooves 280 is a bottomed groove (depression) extending in the front-rear direction, and two grooves 280 are arranged side by side on each of the right and left sides of the second groove portion 232. For example, the groove 280 may be 15 mm in width (lateral length) and 5 mm in depth. With this configuration of the first cover member 210 having the grooves 280 formed on the upper surface thereof, the feel of seating of the car seat S can be improved because an occupant seated on the car seat S is less likely to feel a difference in level that may be made by the air flow groove 230. The number of grooves formed on each of the right and left sides of the second groove portion is not limited to two, and one groove or three or more grooves may be formed. The number of grooves formed on the right side of the second groove portion and the number of grooves formed on the left side of the second groove portion may be different from each other.

In the above-described embodiment, the first recess portion 241 and the second recess portion 242 of which the first engageable recess portion 240 is composed are different in shape. However, the present invention is not limited to this specific configuration. For example, the first recess portion 241 and the second recess portion 242 may be of the same shape.

In the above-described embodiment, the first engageable protruding portion 140 is provided on the pad body 100 and the first engageable recess portion 240 is provided on the first cover member 210. However, the present invention is not limited to this specific configuration. For example, the first engageable protruding portion may be provided on the first cover member and the first engageable recess portion may be provided on the pad body. Further, in the above-described embodiment, the second engageable protruding portion 151 is provided on the pad body 100 and the second engageable recess portion 251 is provided on the second cover member 220. However, the present invention is not limited to this specific configuration. For example, the second engageable protruding portion may be provided on the second cover member and the second engageable recess portion may be provided on the pad body. The number of engageable protruding portions and the number of engageable recess portions may be chosen as appropriate.

In the above-described embodiment, the first engageable protruding portion (the protruding portion only) is provided on one of the pad body and the first cover member, and the first engageable recess portion (the recess portion only), in which the first engageable protruding portion is fitted, is provided on the other one of the pad body and the first cover member. However, the present invention is not limited to this specific configuration. For example, a protruding portion and a recess portion may be provided on one of the pad body and the first cover member, and a recess portion in which the protruding portion is fitted and a protruding portion on which the recess portion is fitted may be provided on the other one of the pad body and the first cover member. The number of protruding portions and the number of recess portions may be chosen as desired. Further, the seat pad may not have a first engageable protruding portion or a first engageable recess portion.

In the above-described embodiment, the size of the second engageable protruding portion 151, 152 and the size of the second engageable recess portion 251, 252 are different between the driver's seat and the passenger's seat in accordance with specifications of the car seat S. However, the present invention is not limited to this specific configuration. For example, the second engageable protruding portion and the second engageable recess portion may be different in any of shape, arrangement position, and the number thereof, according to specifications of the car seat. Further, the second engageable protruding portion and the second engageable recess portion may be different in two or more of shape, size, arrangement position, and the number thereof. In the above-described embodiment, the second engageable protruding portion and the second engageable recess portion are provided on the car seat S for the driver's seat and on the car seat S for the passenger's seat. However, the present invention is not limited to this specific configuration. For example, the second engageable protruding portion and the second engageable recess portion may be provided on one of the car seat S for the driver's seat and the car seat S for the passenger's seat, while the second engageable protruding portion and the second engageable recess portion may not be provided on the other one of the car seat S for the driver's seat and the car seat S for the passenger's seat. This configuration makes it possible to avoid wrong assembly of the pad body and the cover member that are used for the car seats S having different specifications. The seat pad may not have a second engageable protruding portion and a second engageable recess portion.

In the above-described embodiment, the lower surface of the second cover member 220 is fixed to the upper surface of the first engageable protruding portion 140 that is formed on the pad body 100. However, the present invention is not limited to this specific configuration. For example, in the configuration in which the first engageable recess portion is provided on the pad body and the first engageable protruding portion is provided on the first cover member, the lower surface of the second cover member may be fixed to a portion of the upper surface of the pad body by which the first engageable recess portion is formed. Further, in the above-described embodiment, the lower surface of the second cover member 220 is fixed to the upper surface of the first cover member 210 and to the upper surface of the pad body 100. However, the present invention is not limited to this specific configuration. For example, the second cover member may have a lower surface that is fixed to the first cover member, and a side surface (i.e., surface connecting the lower surface and the upper surface) that is fixed to the pad body. Further, the lower surface and the side surface of the second cover member may be fixed to the pad body. Further, in the above-described embodiment, the first cover member 210 is fixed to the pad body 100 only at the lower surface of the first cover member 210. However, the present invention is not limited to this specific configuration. For example, the first cover member may be fixed to the pad body only at the side surface of the first cover member. As an alternative, the first cover member may be fixed to the pad body at the lower surface and the side surface thereof.

In the above-described embodiment, the pad body 100, the first cover member 210, and the second cover member 220 are fixed together by adhesive 300 (by bonding). However, the present invention is not limited to this specific configuration. For example, they may be fixed by welding or other suitable means. Further, the first cover and the second cover may be fixed by welding, while the cover member (the first cover member and the second cover member) and the pad body may be fixed by bonding.

In the above-described embodiment, the seat pad is the seat cushion pad 20, that is, a pad material for the seat cushion S1. However, the present invention is not limited to this specific configuration. For example, the seat pad may be a pad material for the seat back. In this case, the first cover member is disposed on the front surface (i.e., occupant-side surface) of the pad body, and the second cover member is disposed on the front surface (i.e., occupant-side surface) of the first cover member.

In the above-described embodiment, the cross-sectional shape of the connecting member 70 is an oval shape by way of example. However, the present invention is not limited to this specific configuration. For example, the cross-sectional shape of the connecting member 70 may be an ellipse or a generally rectangular shape. Further, the cross-sectional shape of the connecting member may not be limited to have a longer dimension; for example, a circular shape or a generally square shape may be adopted.

In the above-described embodiment, the reinforcement portion 75 has an I-shaped configuration connecting two portions on the inner surface of the connecting member 70 as viewed from the axial direction of the connecting member 70. However, the present invention is not limited to this specific configuration. For example, the reinforcement portion may have a Y-shape connecting three portions on the inner surface of the connecting member 70, or may have a cross shape connecting four portions on the inner surface of the connecting member 70. As an alternative, the reinforcement portion may be of a honeycomb shape. Further, a plurality of reinforcement portions may be provided inside the connecting member. The connecting member without any reinforcement member may also be employed.

In the above-described embodiment, the whole connecting member 70 including the first end portion 70A as one end portion is disposed within the air flow passage 21. However, the present invention is not limited to this specific configuration. For example, the connecting member may be configured such that only one end portion is disposed within the air flow passage and the other end portion is disposed outside the air flow passage (seat pad).

In the above-described embodiment, the recess portion 54, on which the first flange 72 (second stopper portion) of the connecting member 70 is caught, is formed by the root portion 53C of the bellows portion 53. However, the present invention is not limited to this specific configuration. For example, a dedicated recess portion other than the root portion may be formed on the bellows portion. Further, the recess portion may be formed on a portion other than the bellows portion. The duct may not include the bellows portion.

In the above-described embodiment, the first flange 72 is illustrated as an example of the second stopper portion. However, the present invention is not limited to this specific configuration. For example, the second stopper portion may be a protruding portion such as a boss configured to protrude out from the outer peripheral surface of the connecting member. In this case, the recess portion, on which the second stopper portion is caught and thus engaged, and which is formed on the inner surface of the duct may be a groove-shaped recess portion extending in a peripheral direction of the inner surface of the duct 50 like the recess portion 54 in the above-described embodiment. As an alternative, the recess portion may be a hole corresponding to the boss-shaped protruding portion. Further, in the above-described embodiment, the first flange 72 (second stopper portion in the form of a protrusion) formed on the connecting portion 70 is caught on the recess portion 54 (recess-shaped portion) formed on the inner surface of the duct 50. However, the present invention is not limited to this specific configuration. For example, an alternative configuration may be such that a recess-shaped second stopper portion formed on the connecting member is engaged with and thus caught on a protruding portion formed on the inner surface of the duct. The above-described alternative configuration can be applied to the engageable structure between the first stopper portion and the inner surface of the air flow passage.

In the above-described embodiment, the connecting member 70 is inserted in the duct 50. However, the present invention is not limited to this specific configuration. For example, the connecting member 70 may be fitted onto the outer surface of the duct; in other words, the duct may be inserted in the tubular connecting member.

In the above-described embodiment, the pad for the seat cushion S1 (seat cushion pad 20) is illustrated as an example of a seat pad. However, the present invention is not limited to this specific configuration. For example, the seat pad may be a pad for the seat back. In this case, the blower may be provided on the seat cushion as in the above-described embodiment. However, the present invention is not limited to this specific configuration, and the blower may be provided on the seat back. Further, one blower may blow air to the air flow passage for the seat cushion pad and to the air flow passage for the seat back pad through a bifurcating duct. Further, each of the seat cushion and the seat back may be configured to include a pad including an air flow passage, a blower, and a duct.

In the above-described embodiment, a sirocco fan is taken as an example of the blower 40. However, the present invention is not limited to this specific configuration. For example, other types of fans such as a propeller fan and a turbo fan may be used instead. Further, in the above-described embodiment, the car seat S is configured to blow out air by the action of the blower 40. However, the present invention is not limited to this specific configuration. For example, the car seat may be configured to suck air by the action of the blower. Further, the blower may be configured such that the rotational direction of the impeller can be reversed to switch between blowing of air and intaking of air.

In the above-described embodiment, the car seat S installed in an automobile is taken as an example of a seat. However, the present invention is not limited to this specific configuration, and the seat may be any other vehicle seat installed in other vehicles such as rail cars, ships and aircraft. Further, the seat may not be limited to a vehicle seat, and may be a household seat for example.

Each of the elements explained in the above-described embodiment and modified embodiments may be combined optionally.

The invention claimed is:
1. A seat, comprising:
a seat pad including an air flow passage; and
a blower connected to the air flow passage,
wherein the seat pad comprises:
a pad body, and
a cover member,
wherein the pad body has an occupant-side surface, and wherein the cover member is disposed on the occupant-side surface of the pad body to form the air flow passage between the pad body and the cover member, wherein the cover member comprises a first cover member and a second cover member, the first cover member having an occupant-side surface and a reverse-side surface opposite to the occupant-side surface of the first cover member, and the second cover member having an occupant-side surface and a reverse-side surface opposite to the occupant-side surface of the second cover member, wherein a first engageable recess portion recessed leftward or rightward as viewed from an occupant side is provided at one of the pad body or the first cover member, wherein a first engageable protruding portion protruding leftward or rightward as viewed from the occupant side is provided at the other of the one of the pad body or the first cover member, the first engageable protruding portion is fitted in the first engageable recess portion, wherein the first cover member is disposed on the occupant-side surface of the pad body and is fixed to the pad body, wherein the second cover member is disposed on the occupant-side surface of the first cover member, configured to cover the first engageable protruding portion fitted in the first engageable recess portion, and is fixed to the first cover member and to the pad body, wherein the first cover member has an air flow groove that is a through-opening extending through the occupant-side surface and the reverse-side surface of the first cover member, and wherein a space defined by the airflow groove extends in a predetermined direction that is perpendicular to a lateral direction as viewed from the occupant side, and the first engageable protruding portion fitted in the first engageable recess portion extends in the predetermined direction, wherein the pad body further has a reverse-side surface opposite to the occupant-side surface of the pad body and a first ventilation hole that is a through-opening extending through the occupant-side surface and the reverse-side surface of the pad body, wherein a space defined by the first ventilation hole in the pad body extends in the predetermined direction, wherein the first engageable protruding portion comprises a first protruding portion and a second protruding portion apart from each other in the predetermined direction, and wherein the first engageable recess portion includes a first recess portion in which the first protruding portion is fitted, and a second recess portion in which the second protruding portion is fitted.

2. The seat according to claim 1, wherein the second protruding portion fitted in the second recess portion extends in the predetermined direction.

3. The seat according to claim 1, wherein the second cover member has a plurality of second ventilation holes each of which is a through-opening extending through the occupant-side surface and the reverse-side surface of the second cover member, and wherein spaces defined by the plurality of second ventilation holes in the second cover member extend in the predetermined direction, and the first protruding portion fitted in the first recess portion extends in the predetermined direction.

4. The seat according to claim 3, wherein the air flow groove includes a first groove portion positioned to overlap the first ventilation hole as viewed from the occupant side, and a second groove portion positioned to overlap the plurality of second ventilation holes as viewed from the occupant side.

5. The seat according to claim 4, wherein the second groove portion has a substantially U-shaped configuration as viewed from the occupant side and comprises a first portion extending in the lateral direction and left and right second portions extending from left and right ends of the first portion in a direction different from the lateral direction, wherein the plurality of second ventilation holes comprise a left vent set in which a plurality of sets of laterally arranged holes are arranged along the left second portion, and a right vent set in which a plurality of sets of laterally arranged holes are arranged along the right second portion, and wherein a space defined by the second groove portion in the second cover member extends in the predetermined direction.

6. The seat according to claim 1, wherein the seat pad includes right and left tuck-in grooves configured to allow an outer skin material to be tucked therein, wherein the first engageable protruding portion and the first engageable recess portion are disposed laterally inward of the tuck-in grooves.

7. The seat according to claim 1, further comprising a duct through which the blower and the air flow passage communicate with each other, such that air flowing from the blower through the duct and the air flow passage is ejected out through an occupant-side surface of the seat pad toward a seated occupant.

8. The seat according to claim 1, further comprising an outer skin material with which the seat pad is covered, wherein the outer skin material is made of a material having air permeability, or has ventilation holes through which air ejected out from the seat pad is allowed to pass.

9. A method of assembly of a seat, comprising:

providing a pad body, a first cover member and a second cover member, wherein the pad body has a first ventilation hole that is a through-opening extending through an occupant-side surface and a reverse-side surface opposite to the occupant-side surface of the pad body, a first engageable recess portion recessed as viewed from an occupant side is provided at one of the pad body or the first cover member, and a first engageable protruding portion protruding as viewed from the occupant side is provided at the other one of the pad body or the first cover member, the first cover member has an air flow groove that is a through-opening extending through an occupant-side surface and a reverse-side surface opposite to the occupant-side surface of the first cover member, the first engageable protruding portion comprises a first protruding portion and a second protruding portion apart from each other in a predetermined direction perpendicular to a lateral direction as viewed from the occupant side, and the first engageable recess portion includes a first recess portion in which the first protruding portion is fitted, and a second recess portion in which the second protruding portion is fitted;

placing the first cover member on the occupant-side surface of the pad body while fitting the first engageable protruding portion in the first engageable recess portion in such position that a space defined by the air flow groove in the first cover member extends in the predetermined direction, the first engageable protruding portion fitted in the first engageable recess portion extends in the predetermined direction, and a space defined by the first ventilation hole in the pad body extends in the predetermined direction;

fixing the first cover member to the pad body;

placing the second cover member on an occupant-side surface of the first cover member in such a manner that the first engageable protruding portion fitted in the first engageable recess portion is covered with the second cover member;

fixing the second cover member to the first cover member and to the pad body to thereby form a seat pad including the air flow passage; and connecting a blower to the air flow passage.

\* \* \* \* \*